United States Patent
Karri et al.

(10) Patent No.: US 12,143,023 B2
(45) Date of Patent: Nov. 12, 2024

(54) DRIVE SCHEME FOR SECONDARY-CONTROLLED ACTIVE CLAMP FLYBACK (ACF) MODE

(71) Applicant: Cypress Semiconductor Corporation, San Jose, CA (US)

(72) Inventors: Rajesh Karri, Visakhapatnam (IN); Arun Khamesra, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 281 days.

(21) Appl. No.: 17/748,616

(22) Filed: May 19, 2022

(65) Prior Publication Data

US 2023/0378877 A1   Nov. 23, 2023

(51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01)

(58) Field of Classification Search
CPC ......... H02M 3/33569; H02M 3/33573; H02M 3/33576; H02M 3/33592; H02M 3/337; H02M 3/3376; H02M 3/338; H02M 3/3385; H02M 3/33553; H02M 3/33546; H02M 3/33523; H02M 3/33507; H02M 1/08; H02M 1/088
See application file for complete search history.

(56) References Cited

U.S. PATENT DOCUMENTS

| | | | |
|---|---|---|---|
| 2007/0242486 A1* | 10/2007 | Moromizato | H02M 3/33592 363/21.06 |
| 2016/0352231 A1* | 12/2016 | Quigley | H02M 1/36 |
| 2019/0036459 A1* | 1/2019 | Ding | H02M 1/08 |

OTHER PUBLICATIONS

Power Integrations, Inc., InnoSwitch4-CZ Family, Off-Line CV/CC ZVS Flyback Integrated Switcher IC with 750 V PowiGaN, Active Clamp Drive and Synchronous Rectification, InnoSwitch4-CZ, May 2022, 36 pages.

* cited by examiner

*Primary Examiner* — Nguyen Tran

(57) ABSTRACT

Controlling an active clamp field effect transistor (FET) and a primary-side FET in a secondary-controlled active clamp converter is described. In one embodiment, an apparatus includes a primary-side FET coupled to a transformer and an active clamp FET disposed on a primary side of the transformer. A secondary-side controller is configured to control the active clamp FET and the primary-side FET across a same galvanic isolation barrier.

17 Claims, 12 Drawing Sheets

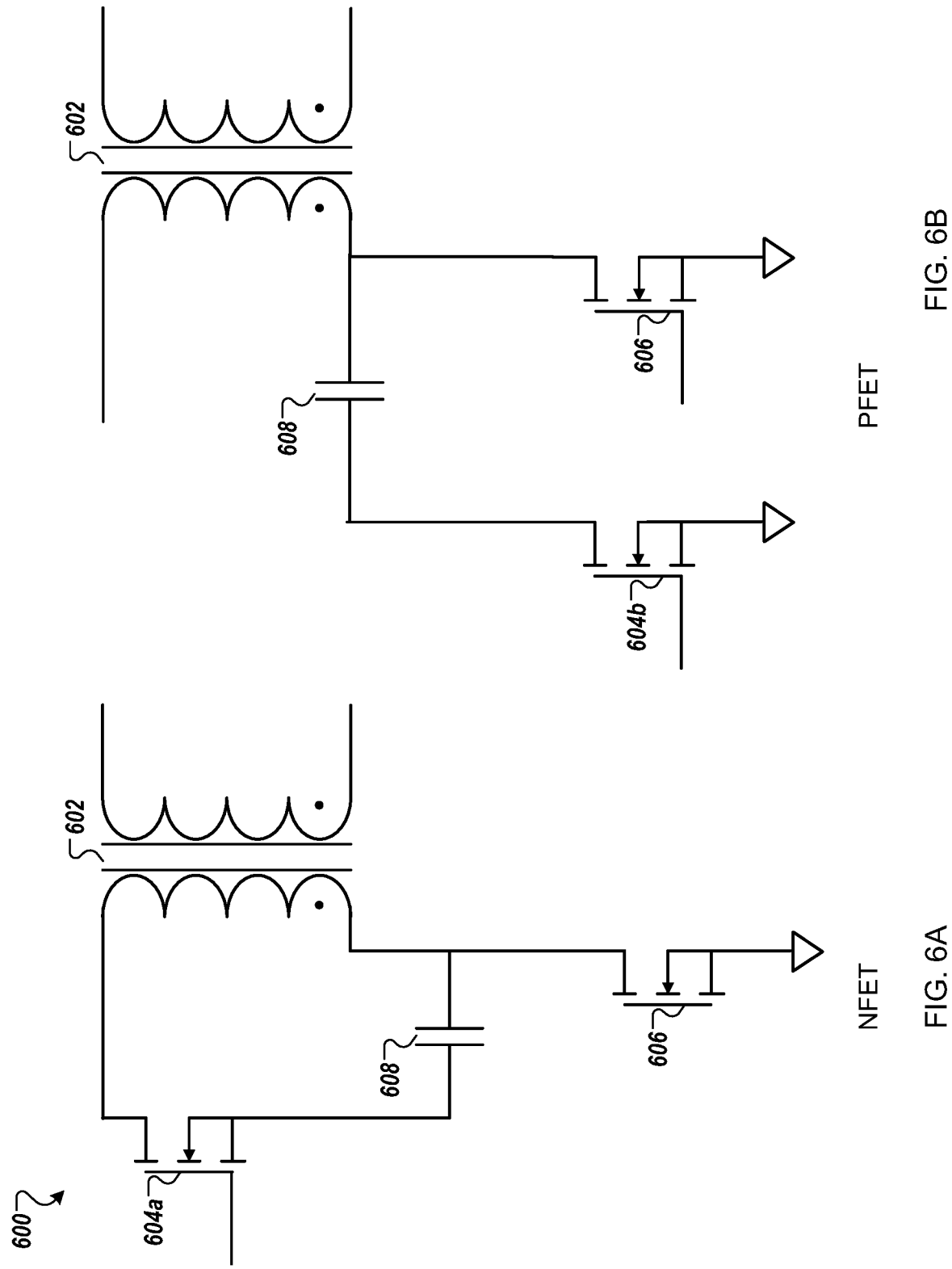

DRIVE SCHEME FOR SECONDARY-CONTROLLED ACTIVE CLAMP FLYBACK (ACF) MODE

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, a power adapter can include an alternating current to direct current (AC-DC) converter can include one or more integrated USB power delivery (PD) controllers, such as a primary-side controller and a secondary-side controller that supports dynamically variable switching frequency.

BRIEF DESCRIPTION OF THE DRAWINGS

The disclosure is illustrated by way of example, and not of limitation, in the figures of the accompanying drawings.

FIG. 6A is a block diagram of a circuit of an active clamp N-channel field-effect transistor (NFET) according to one embodiment.

FIG. 6B is a block diagram of a circuit of an active clamp P-channel field-effect transistor (PFET) according to one embodiment.

DETAILED DESCRIPTION

Figure 1:
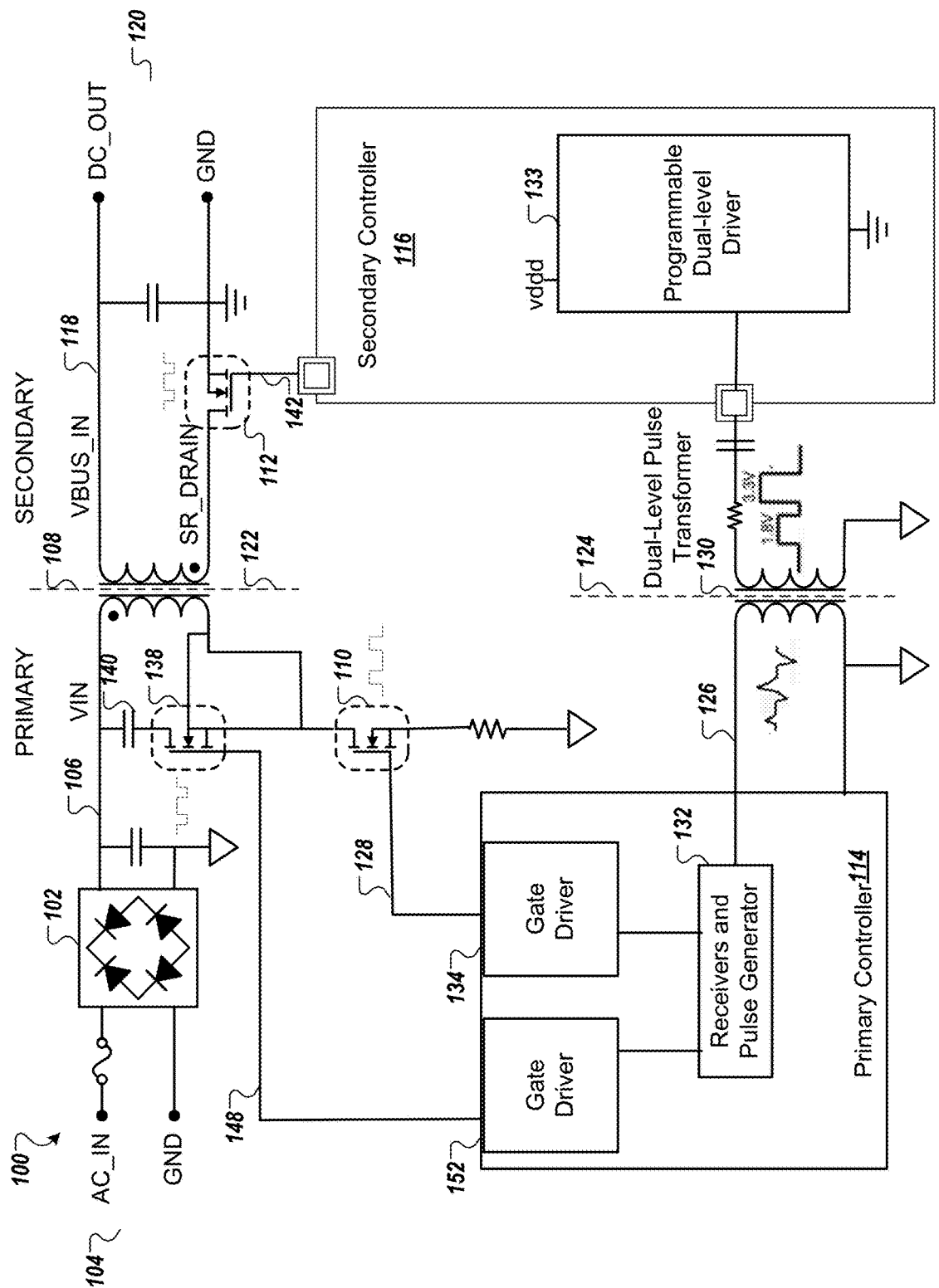
FIG. 1 is a block diagram of a secondary-controlled converter with secondary-controlled active-clamp control over a same galvanic isolation barrier as a primary-side power switch from a secondary side to a primary side, according to one embodiment.

The following description sets forth numerous specific details such as examples of specific systems, components, methods, and so forth, in order to provide a good understanding of various embodiments of the techniques described herein for driving a secondary-controlled flyback converter for an active clamp flyback (ACF) mode, such as used in USB power delivery applications. However, it will be apparent to one skilled in the art that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for controlling an active clamp FET and a primary-side FET using a secondary-side controller across a dual-level pulse transformer in a secondary-controlled flyback converter coupled to power lines in electronic devices in USB power delivery (USB-PD.) Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery. The embodiments described herein can be used for AC-to-DC power adapters, GaN-based power adapters operating at 600 kHz frequencies, power adapters with primary or secondary side controllers, power adapters operating in modes of operations, such as quasi-resonant mode (QR), discontinuous conduction mode (DCM), continuous conduction mode (CCM), or the like. The embodiments described herein can be used in power-adapter solutions along with Type-C PD capability. These embodiments allow for more efficient performance, allowing lower-rated, and thus cheaper, FETs to be used by engaging the active clamp FET by the secondary-side controller, which determines to turn ON/OFF the active clamp FET based on parameters on the secondary-side. Active clamps may also help reduce electromagnetic interference (EMI), which helps in reducing filters on the input.

A USB-enabled electronic device or a system may comply with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications. Still, it extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0, Release 1.1, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1/3.2, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors (also referred to as USB-C connector), etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. The Type-C plug and the Type-C receptacle are designed as a reversible pair that operates regardless of the plug-to-receptacle orientation for ease of use. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0, Revision 2.0, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100W of power. According to the USB-PD specification, devices with USB Type-C ports (e.g., USB-enabled devices) may negotiate for more current and/or higher or lower voltages over a USB Type-C cable than are allowed in older USB specifications (e.g., the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that both devices can accommodate and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled inline on the VBUS line and configured to turn power delivery on and off.

A USB-PD power source may be configured to draw power from an alternating current (AC) power adapter or another AC source. Thus, as part of an alternating current-to-direct current (AC-DC) conversion, some implementations may use a large bulk capacitor on the power source side of the VBUS line to remove the power signal's AC component. Turn-ON and turn-OFF of power switches (also called power FETs) may allow for further circuit protection based on analysis of current and voltage conditions and the detection of faults.

In one flyback converter, an active clamp FET is driven by a primary-side controller. However, a primary-side controller in a secondary-controlled flyback converter is designed without much intelligence since any intelligence added to the primary-side controller results in: a larger chip area due to higher technology node, which results in higher costs;

higher mask count due to the intelligence logic circuitry needing more fuses or non-volatile memory, which results in higher costs; and higher power loss due to an additional circuit (current taken at higher voltages). Thus, to drive the active clamp FET, a primary-side controller can use a waveform signal 180 degrees out of phase with the waveform signal used to drive a primary-side FET. In such a setup, the active clamp FET may be engaged for longer than necessary, resulting in wasted energy and decreased efficiency. Further, the primary-side controller does not have access to electrical parameters related to the load requirements on the power output. As a result, the primary-side controller is not able to determine whether or not it may be beneficial to engage the active clamp FET or determine the duration of switching of the active clamp FET (e.g., the duration for which the active clamp FET is ON and the duration for which the active clamp FET is OFF), which may result in additional losses due to unnecessary gate switching.

A high-speed communication link is needed between the primary and secondary sides to control a primary-side FET on a primary side by a secondary-side-control (SSC) flyback controller. The delay of this link is important for zero voltage switching (ZVS) and valley switching as the delay can impact efficiency. A pulse transformer (PT) is a component that can act as a communication link between the primary and secondary sides in an SSC flyback converter. Similarly, a high-speed communication link would be needed to control an ACF mode. If both the primary-side FET and an active clamp flyback FET (ACF FET) are controlled, the secondary-side-control (SSC) flyback controller needs to deliver two different gate signals—one for the ACF FET and another for the primary-side FET. The signals need to be transferred from the secondary side to the primary side with critical timing requirements of the dead time between the two gate signals, such as less than 50 nanoseconds between these two gate signals. Although two PTs can be used for the two gate signals, two PTs would double the implementation cost, board space, and bill of materials (BOM). For example, the BOM increases to provide two pulse transformers, two separate drivers, and extra terminals for ACF mode on both the primary and secondary sides. Moreover, managing the relative delay across the transformers would be critical as it impacts the converter's efficiency or can malfunction.

Described herein are various embodiments of techniques for improving efficiency over the conventional flyback converter by controlling the active clamp FET and the primary-side FET from a secondary-side controller in a secondary-controlled converter using a dual-level pulse transformer. The embodiments of the secondary-controlled active clamp control described herein may address the above-mentioned and other challenges without the additional logic and circuits and complicated protocols described above by controlling the active clamp FET and the primary-side FET from the secondary-side controller. The embodiments described herein can use a dual-level pulse transformer drive scheme by which the secondary-controlled converter can control both ACF and primary switches without the need for any new external components while meeting the timing requirements of ACF. In some embodiments, the secondary-controlled active clamp described herein may be used in a secondary-controlled flyback converter. Alternatively, the secondary-controlled active clamp can be used in other secondary-controlled converters. In some embodiments, the secondary-controlled active clamp may increase the efficiency over the traditional flyback converter by 3-4%. In some embodiments, the secondary-side controller can provide a control signal to control the active clamp FET on the primary side. In some embodiments, the active clamp FET on the primary side can be controlled to follow a synchronous rectification ON/OFF cycle of the secondary-side FET. In some embodiments, instead of using a separate pulse transformer to switch the active clamp FET, the synchronous gate rectifier pulses from the secondary side may be used to generate a dual-level signal sent by the dual-level pulse transformer to switch the active clamp FET and the primary-side FET over the same communication link.

In at least one embodiment, a dual-level pulse transformer can use an amplitude modulation drive scheme. In a drive scheme, a low voltage level can be a lower voltage (LV) level used to send the information about the ACF FET to turn ON and OFF via the dual-level pulse transformer. A high voltage (HV) level can be a higher voltage level used to send the information about the primary-side FET to turn ON and OFF via the same dual-level pulse transformer. As noted above, there are no additional external components, board components, or terminals, as the board components and terminals used for the primary-side FET and ACF FET are the same. The dual-level pulse transformer may be coupled between the secondary-side controller and the active clamp FET in order to control the active clamp FET. For example, a hardware-controlled scheme or a firmware-controlled scheme can define the control signal using multiple consecutive pulses (e.g., +ve or −ve pulses) given across a galvanic isolation barrier, such as across a pulse transformer, to control the active clamp FET and the primary-side FET from the secondary-side controller. In these embodiments, the secondary-side controller drives the active clamp FET and the primary-side FET over the same dual-level transformer. The secondary-side controller further has access to electrical parameters (e.g., line/load information on the secondary side) on the secondary side and may use these parameters to determine whether or not it is beneficial to switch on the active clamp FET. The secondary-side controller may delay the active clamp FET turn-ON to avoid cross conduction or turn OFF the active clamp FET earlier to prevent keeping the active clamp FET ON for too long. If the secondary-side controller determines that it is beneficial to engage the active clamp FET, it may send the control signal across the dual-level pulse transformer to the active clamp FET to turn on the active clamp FET. As described above, a primary-side controller is not able to determine whether or not it may be beneficial to engage the active clamp FET or determine the duration of switching of the active clamp FET (e.g., the duration for which the active clamp FET is ON and the duration for which the active clamp FET is OFF), which may result in additional losses due to unnecessary gate switching. The secondary-side controller, however, can determine whether or not it may be beneficial to engage the active clamp FET or determine the duration of the switching of the active clamp FET, including the duration for which the active clamp FET is ON and the duration for which the active clamp FET is OFF.

In at least one embodiment, a first drive scheme has two supplies used on a driver to do amplitude modulation. In this scheme, two supplies with different voltage levels are used for driving two levels on the pulse transformer. For example, an HV supply can use a first chip supply Vddd (e.g., 3V-5V) for the HV level, and an LV supply can use a second chip supply Vccd (e.g., 1.65V-1.95V), or an internally generated supply, for the LV level. In this drive scheme, a ground to Vddd switching with a first-level pulse, HV +ve level pulse, turns ON the primary-side FET. A Vddd to ground switching with a first-level pulse, HV −ve level pulse, turns OFF the primary-side FET. A ground to Vccd switching with a second-level pulse, LV +ve level, turns ON the ACF FET. A Vccd to ground switching with a second-level pulse, LV −ve level, turns OFF the ACF FET.

In at least one embodiment, a second drive scheme has a signal supply (e.g., Vddd 3V-5V) used on a driver to do amplitude modulation. In particular, the second drive scheme can use a middle level (or mid-level) on a driver to do amplitude modulation. In this second drive scheme, a mid-level is created using a programmable voltage supply, Vddd-IR, for driving two levels on the dual-level pulse transformer. In this drive scheme, a single pulse, −ve level, is used for switching off ACF FET or primary-side FET. A ground to Vddd switching with a first-level pulse, HV +ve level pulse, turns ON the primary-side FET. A mid-level to Vddd switching with a second-level pulse, LV +ve level pulse, turns ON the ACF FET. A Vddd to mid-level switching with a second pulse, LV −ve level, turns the active clamp FET OFF or primary-side FET OFF. The second drive scheme can provide a reliable, clamped mid-level voltage as an HV ground level. It should be noted that the communication of a multi-level code on a single transformer carries a risk of mis-communication. For example, an LV level can be interpreted as an HV level. This can be further aggravated with the resonance phenomenon of the transformer. A mid-level clamped voltage is generated to eliminate this effect by controlling the amplitude voltage level of the pulse, −ve, for the primary switch to turn off. It can ensure that a positive pulse, +ve LV (HV) signal is always after a negative pulse, −ve LV (HV) signal. In at least one embodiment, the mid-level voltage is programmable and can be varied to increase the noise margin between HV and LV signaling, as well as the resonance to LV signaling. In at least one embodiment, a calibration loop from the secondary side can be used to set or program an LV peak. A mid-level voltage can be varied during calibration, and an LV drive signal is asserted while the response is measured on the secondary drain using a zero-crossing detector (ZCD). This programmable value can provide a larger margin between HV and LV levels. The programmability can be used to account for variations in the transformer or die. The embodiments described herein can be used in the AC-DC secondary-side controller of a flyback controller and can help improve the reliability and efficiency of the flyback controller.

The embodiments described herein may address the above-mentioned and other challenges by providing a serial bus-compatible power supply device, such as a serial bus power delivery (SBPD) device with a power control analog subsystem having hardware, firmware, or any combination to communicate information, including a multi-level control signal from a secondary-side controller to intelligently drive an active clamp FET from a secondary side, across a galvanic isolation barrier, and drive a primary-side FET from the secondary side, across the same galvanic isolation barrier. A pulse transformer may provide the galvanic isolation barrier in one embodiment. The galvanic isolation may be provided by an opto-coupler, a capacitive isolator, or the like in other embodiments. The SBPD (also referred to as a "source device" herein) may be a USB-compatible power supply device. The embodiments described herein can also be implemented in other types of power adapters, power converters, power delivery circuits, or the like.

FIG. 1 is a block diagram of a secondary-controlled converter 100 with secondary-controlled active-clamp control over a same galvanic isolation barrier as a primary-side power switch from a secondary side to a primary side according to one embodiment. In some embodiments, the secondary-controlled converter 100 may be a secondary-controlled flyback converter. The secondary-controlled flyback converter 100 can be part of an AC-DC power adapter device. The secondary-controlled flyback converter 100 includes a rectifier 102 (e.g., full-bridge rectifier) coupled between AC input terminals 104 and a rectified DC line 106 (VIN), a flyback transformer 108, the flyback transformer 108 including a primary winding coupled to the rectified DC line 106, a primary-side FET 110 (also referred to as a primary-side power switch, a power FET, or a primary-side FET), a secondary-side FET 112 (also referred to as secondary-side power switch, power FET, or secondary FET), an active clamp FET 138, a primary-side controller 114, and a secondary-side controller 116. The rectified DC line 106 is coupled to a first end of a primary winding of the flyback transformer 108. VIN is the voltage on the rectified DC line 106 after the rectifier 102. A second end of the primary winding is coupled to a primary drain of the primary-side FET 110 and a source of the active clamp FET 138. The source node of the active clamp FET 138 is coupled to a primary drain of the primary-side FET 110. A drain node of the active clamp FET 138 is coupled to DC-blocking capacitor 140. A gate node of the active clamp FET 138 is coupled to the primary controller 114 to be controlled via pulses from a dual-level pulse transformer 130.

A first end of the secondary winding of the flyback transformer 108 is coupled to a direct current (DC) output line 118 (VBUS_IN) and a second end of the secondary winding is coupled to a secondary drain of the secondary-side FET 112 (SR_Drain). In an alternate embodiment, the DC blocking capacitor may be coupled between the drain node of the primary-side FET 110 and the source node of the active clamp FET 138. In this configuration, the drain node of the active clamp FET 138 is coupled directly to the rectified DC line. VBUS_IN is the voltage on the DC output of the flyback transformer 108. SR_Drain is the drain node of the secondary-side FET 112. The DC output line 118 and the secondary-side FET 112 are coupled to DC output terminals 120.

The secondary-controlled flyback converter 100 is used for AC-DC conversion with galvanic isolation between the inputs and any outputs. The secondary-controlled flyback converter 100 uses an inductor split with the flyback transformer 108 with a galvanic isolation barrier 122 between a primary side and a secondary side. When the primary-side FET 110 (the primary-side FET) is closed (or turned OFF), the primary-side of the flyback transformer 108 is connected to the input voltage source. In this embodiment, the primary-side of the flyback transformer 108 is coupled to the rectifier 102. As the primary current and magnetic flux in the flyback transformer 108 increases, energy is stored in the transformer core of the flyback transformer 108. The voltage induced in the secondary winding is negative and blocked by the secondary rectifier 112. When the primary-side FET 110 (the primary-side FET) is opened (or turned ON), the primary current and magnetic flux drop. The secondary voltage is positive, allowing current to flow from the flyback transformer 108. The energy stored in the transformer is transferred to an output load. An output capacitor can be used to supply energy to the output load when the primary switch (e.g., the primary-side FET) is engaged. Thus, the flyback transformer 108, based on control of the primary-side FET 110 can store energy and transfer the energy to the output of the secondary-controlled flyback converter 100. It should also be noted that the secondary-controlled flyback converter 100 can include other components in the input stage, in the output stage, or in both. For example, a bulk capacitor can be coupled between the output of the rectifier 102 and a ground node. During operation, the AC input power is rectified and filtered by the rectifier 102 (bridge rectifier) and the bulk capacitor. This creates a DC high voltage bus which is connected to the primary winding of the flyback transformer 108. Similarly, in the output stage, the secondary winding power is rectified and filtered, such as by a diode, a capacitor, output LC-filters, or the like, to reduce the output voltage ripple. Other output voltages can also be realized by adjusting the flyback transformer's turn ratio and the output stage. In some embodiments, other converters may be used instead of the flyback transformer, e.g., a switching converter, or the like.

The secondary-controlled flyback converter 100 operates as an isolated power converter. The two prevailing control schemes are voltage mode control and current mode control. Both control schemes use a signal related to the output voltage. An opto-coupler or a pulse transformer can be coupled to the secondary-side controller 116 and can send a signal to the primary-side controller 114 to indicate the output voltage, such as described in more detail below. The opto-coupler or the pulse transformer can be used to obtain tight voltage and current regulations.

In the depicted embodiment, the secondary-side controller 116 is configured for controlling the active clamp FET 138 on the primary side, the primary-side FET 110 on the primary side, and the secondary-side FET 112 on the secondary side. In one embodiment, the primary-side controller 114 is configured to receive a multi-level signal 126 from the secondary-side controller 116 across the galvanic isolation barrier 124. The primary-side controller 114 applies a first signal 128 to the primary-side FET 110, in response to the multi-level signal 126 to turn-on and turn-off the primary-side FET 110. The primary-side controller 114 applies a second signal 148 to the active clamp FET 138, in response to the multi-level signal 126 to turn-on and turn-off the active clamp FET 138.

In one embodiment, the secondary-controlled flyback converter 100 includes a dual-level pulse transformer 130 coupled between the primary-side controller 114 and the secondary-side controller 116. The primary-side controller 114 is configured to receive the multi-level signal 126 from the secondary-side controller 116 as one or more pulses at multiple levels via the dual-level pulse transformer 130. The primary-side controller 114 can include one or more receivers and pulse generators 132 to receive the pulse signals of the multi-level signal 126 from the secondary-side controller 116 across the galvanic isolation barrier 124. The one or more receivers and pulse generators 132 can change the primary-side turn-on pulse based on output of the flyback transformer 108 (e.g., Error Amplifier (EA) output). The primary-side FET turn-on pulse of the multi-level signal 126 is used to turn on the primary-side FET 110. The active clamp FET turn-on pulse of the multi-level signal 126 is used to turn on the active clamp FET 138. With higher EA voltages, wider pulse width modulation (PWM) pulses are sent from secondary-side controller 116 via dual-level pulse transformer 130 which results in wider primary turn-on pulses being used. The primary-side controller 114 can also include a first gate driver 134 and a second gate driver 152, each coupled to the one or more receivers and pulse generators 132, to drive a gate of the primary-side FET 110 and a gate of the active clamp FET 138, respectively. As described herein, the turn-on and turn-off pulses can have fixed widths or variable widths. In one embodiment, the one or more receivers and pulse generators 132 can include a PWM circuit. Alternatively, the one or more receivers and pulse generators 132 can use other types of circuits to receive the pulses across the galvanic isolation barrier 124.

In one embodiment, the primary-side controller 114, in order to apply the first signal 128 to the primary-side FET 110, is configured to receive a turn-on pulse at a first level from the secondary-side controller 116. For example, the primary-side controller 114 applies the turn-on pulse to the gate of the primary-side FET 110 via the first gate driver 134. The turn-on pulse causes the primary drain of the primary-side FET 110 to go low (e.g., a first voltage level corresponding to a first state or representing the digital value of one). Subsequently, the primary-side controller 114 receives a turn-off pulse from the secondary-side controller 116 and applies the turn-off pulse to the gate of the primary-side FET 110 via the first gate driver 134. The turn-off pulse causes the primary drain of the primary-side FET 110 to go high (e.g., a second voltage level corresponding to a second state or representing the digital value of zero). The primary-side controller 114, in order to apply the second signal 148 to the active clamp FET 138, is configured to receive a turn-on pulse at a second level (e.g., lower level than the first level) from the secondary-side controller 116. For example, the primary-side controller 114 applies the turn-on pulse to the gate of the active clamp FET 138 via the second gate driver 152. The turn-on pulse causes the primary drain of the active clamp FET 138 to short the drain and source of the active clamp FET 138 by shorting the capacitor 140 to the primary winding of the flyback transformer 108 (e.g., a first voltage level corresponding to a first state or representing the digital value of one). Subsequently, the primary-side controller 114 receives a turn-off pulse from the secondary-side controller 116 and applies the turn-off pulse to the gate of the active clamp FET 138 via the second gate driver 152. The turn-off pulse causes the primary drain of the active clamp FET 138 to go down (e.g., a second voltage level corresponding to a second state or representing the digital value of zero). The value the active clamp FET 138 reaches depends on various conditions, such as leakage inductance, turn-on time, and the transformer operating mode.

In one embodiment, the secondary-side controller 116 sends a control signal over input line 142 to the secondary-side FET 112 and sends the same control signal to the active clamp FET 138 via dual-level pulse transformer 130. The active clamp FET 138 and the secondary-side FET 112 turn ON in-phase in response to receiving a turn-on pulse of the control signal. Subsequently, the active clamp FET 138 and the secondary-side FET 112 turn OFF in response to receiving a turn-off pulse of the control signal. As described herein, the turn-on and turn-off pulses of the control signal may have fixed widths or variable widths.

In one embodiment, the secondary-side controller 116 includes a programmable dual-level driver 133 to generate a multi-level signal 126 to send to the primary-side controller 114 over the galvanic isolation barrier 124. Using the programmable dual-level driver 133, the secondary-side controller is able to send any combination of 0s and 1s with a specific pattern (protocol) from the secondary-side controller 116 to the primary-side controller 114 without a requirement of clock synchronization. In one embodiment, the secondary-side controller 116 includes a state machine to synchronize each function of the primary-side controller 114 to be programmed (e.g., calibrated, trimmed, or the like). The secondary-side controller 116 can store other information, such as user-defined settings. For example, the user defined settings pertaining to the primary-side functionality, such as over-voltage (OV), under-voltage (UV), over-current (OC), short-circuit detection, over-temperature (OT), line voltage, peak current limits, or the like, can be stored in the non-volatile memory of the secondary-side controller 116. Firmware of the secondary-side controller 116 can transfer this information to the primary-side controller 114 in a similar manner at appropriate times, such as at boot-up or later during operation of the converter at a specific time.

In one embodiment, the secondary-side controller 116 includes a programmable dual-level driver 133 to generate a second signal to send to the secondary FET 112 over line 142 and a multi-level signal 126 to the primary controller 114 over dual-level pulse transformer 130 to control both the active clamp FET 138 and the primary-side FET 110. Using the programmable dual-level driver 133, the secondary-side controller is able to send any combination of 0s and 1s with a specific pattern (protocol) from the secondary-side controller 116 to the active clamp FET 138 and/or the primary-side FET 110. In one embodiment, the secondary-side controller 116 includes a state machine to synchronize each function of the primary-side controller 114 to be programmed (e.g., calibrated, trimmed, or the like). The secondary-side controller 116 can store other information, such as user-defined settings. For example, the user-defined settings pertaining to controlling the active clamp FET 138 and/or the primary-side FET 110, can be stored in the non-volatile memory of the secondary-side controller 116. Firmware of the secondary-side controller 116 can transfer this information to active clamp FET and/or the primary-side FET in a similar manner at appropriate times, such as at boot-up or later during operation of the converter at a specific time.

As illustrated in FIG. 1, the secondary-side controller 116 can communicate control signals for controlling all switches (e.g., the primary-side FET 110, the active clamp FET 138, and the secondary-side FET 112). A multi-level signal 126 is communicated to the primary-side controller 114 over the galvanic isolation barrier 124, such as via the dual-level pulse transformer 130. A second control signal 142 is communicated to the secondary-side FET 112 by the secondary-side controller. In another embodiment, the same second control signal is communicated to the active clamp FET 138 (e.g., second pulse) over dual-level pulse transformer 130 as is communicated to the secondary-side FET 112. The secondary-side controller 116 can provide a programmable, dual-level pulse transformer drive scheme by which the secondary-side controller 116 can control both the active clamp FET and the primary-side FET without the need for any new external components while satisfiying the timing requirements of an ACF mode. Additional details of the programmable dual-level driver 133 are described below with respect to FIG. 2.

Figure 2:
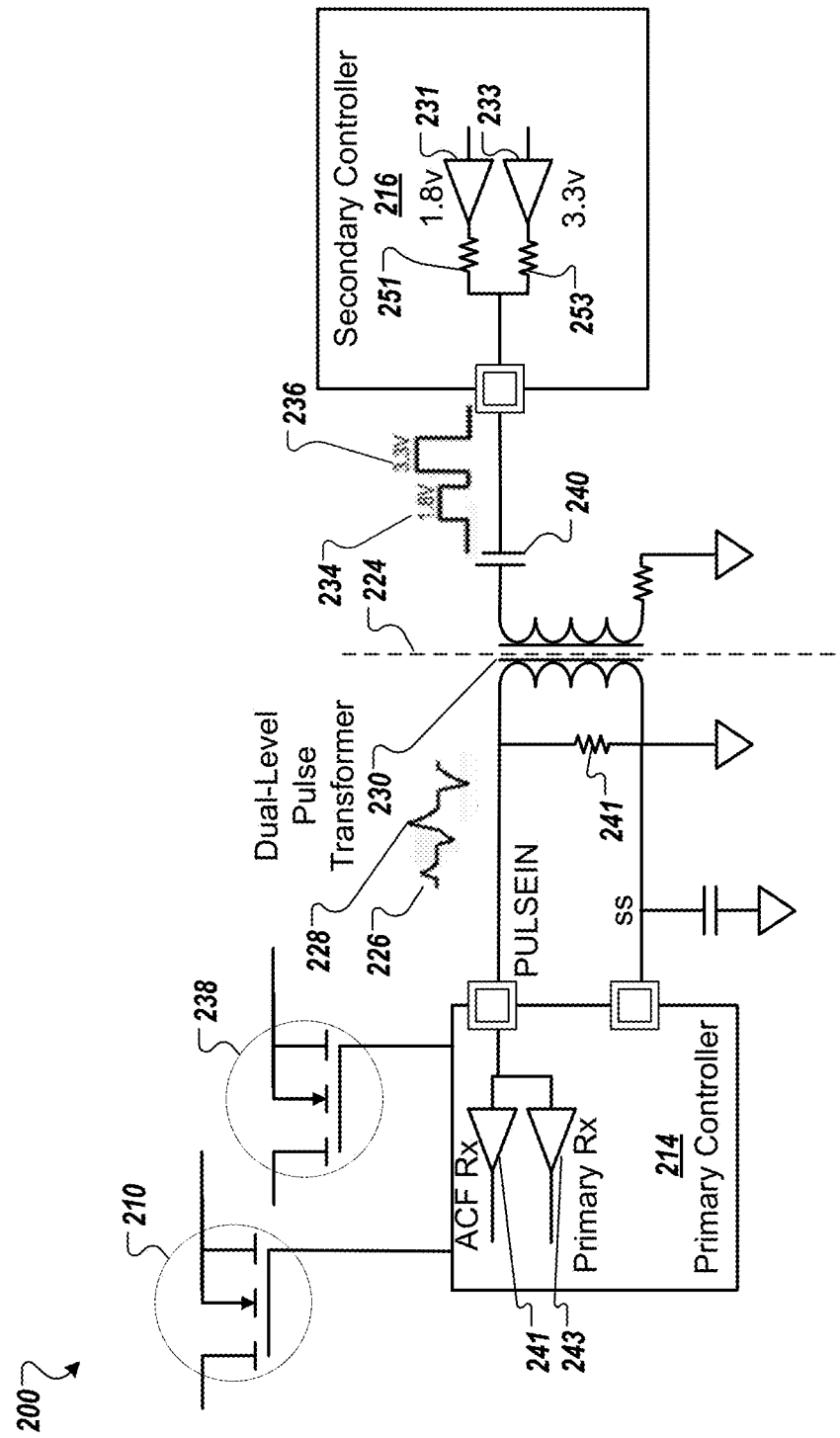
FIG. 2 is a block diagram of a secondary-controlled flyback converter with a secondary-side controller that controls an active clamp field-effect transistor (FET) and a primary-side FET on a primary side over a same galvanic isolation barrier according to one embodiment.

FIG. 2 is a block diagram of a secondary-controlled flyback converter 200 with a secondary-side controller 216 that controls an active clamp FET 238 and a primary-side FET 210 on a primary side over a galvanic isolation barrier 224 according to one embodiment. Although not all components of the secondary-controlled flyback converter 200 are shown, the secondary-controlled flyback converter 200 is similar to the secondary-controlled flyback converter 100 of FIG. 1, as noted by similar reference numbers. In one embodiment, to control the active clamp FET 238, the secondary-side controller 216 can send pulses to the active clamp FET 238 across a galvanic isolation barrier 224, such as via a pulse transformer 230. In one embodiment, to control the primary-side FET 210, the secondary-side controller 216 can send pulses to the primary-side FET 210 across the same galvanic isolation barrier 224, such as via the dual-level pulse transformer 230. In at least one embodiment, the secondary-side controller 216 sends a first pulse 234 at a first signal level (e.g., 1.8v) to the active clamp FET 238 via the dual-level pulse transformer 230, and a second pulse 236 at a second signal level (e.g., 3.3v) to control the primary-side FET 210 via the dual-level pulse transformer 230. The second signal level is different than the first signal level. For example, the second signal level can be greater than the first signal level. Alternatively, the second signal can be less than the first signal level. In another embodiment, the second signal level is lower than the first signal level, such as 3.3v and 1.8v, respectively.

In at least one embodiment, the secondary-side controller 216 includes a first-level signal generator 231 to generate a first signal at a first signal level, such as the first pulse 234 to control at least the active clamp FET 238 via dual-level pulse transformer 230. The secondary-side controller 216 includes a second-level signal generator 233 to generate a second signal at a second signal level, such as the second pulse 236 to control at least the primary-side FET 210. In another embodiment, a single signal generator can generate the first signal (e.g., first pulse 234) and the second signal (e.g., second pulse 236). In at least one embodiment, the first-level signal generator 231 can include one or more pull-up transistors and one or more pull-down transistors. In at least one embodiment, the second-level signal generator 233 can include one or more pull-up transistors and one or more pull-down transistors. The pull-up and pull-down transistors can be controlled by control logic or firmware of the secondary-side controller 216. During a normal mode, the first-level signal generator 231 can generate and output a first square wave signal at the first level, and the second-level signal generator 233 can generate and output a second square wave signal at the second level. A capacitor 240 is coupled between dual-level pulse transformer 230 and the first and second-level signal generators 231, 233. A resistor can also be coupled in series with the capacitor. The first and second-level signal generators 231, 233, each generate a positive pulse on a positive transition of the square wave signal (i.e., rising edge) and a negative pulse on a negative transition of the square wave signal (i.e., falling edge). The positive and negative edges are transferred to the primary-side controller 214 via dual-level pulse transformer 230. The primary-side controller 214 receives the positive and negative edges to create PWM pulses used to turn on and turn off the primary-side FET 210 and the active clamp FET 238. Example waveforms of the square wave generated by the first and second-level signal generators 231, 233, at the two levels, are shown in FIG. 2. Example waveforms of the positive and negative pulses, generated by the capacitor 240 at the two levels are shown in FIG. 2.

In at least one embodiment, the secondary-side controller 216 can generate the square wave signal during normal operation (e.g., in a normal operating mode), resulting in positive and negative pulses by the capacitor 240. A positive pulse, +ve, and a negative pulse, −ve, can be used to activate the primary-side FET 210, or the active clamp FET 238, based on which of the two levels are being used, as described herein. For example, a logic "1" uses a "+ve" pulse, and a logic "0" uses a "−ve" pulse. The pull-up transistor and pull-down transistor can be controlled to generate +ve and −ve edges.

In at least one embodiment, the secondary-side controller 216 includes a programmable reference supply coupled to the first-level signal generator 231. The first-level signal generator 231 is coupled to a voltage supply (e.g., Vddd) and the programmable reference supply. The programmable reference supply provides a third signal level. The first-level signal generator 231 can be considered a mid-level signal generator that generates the first pulse 234 at the first signal level (e.g., a mid-level between Vddd and 0). The mid-level can operate as a zero for the second level (e.g., high-voltage (HV) level corresponding to Vddd). The second-level signal generator 233 is also coupled to the same voltage supply (e.g., Vddd). The second-level signal generator 233 generates the second pulse 236 at the second signal level. In this embodiment, the first signal level is greater than the third signal level and less than the second signal level.

In at least one embodiment, the first-level signal generator 231 includes a first pull-up transistor and a first pull-down transistor, and the second-level signal generator 233 includes a second pull-up transistor and a second pull-down transistor to generate the second pulse. The secondary-side controller 216 can include a pull-up pre-driver to activate the second pull-up transistor to turn on the primary-side FET 210 and a pull-down pre-driver to activate the second pull-down transistor to turn off the primary-side FET 210 or the active clamp FET 238. The secondary-side controller 216 can include a pre-driver coupled to the programmable reference supply. The pre-driver can activate the first pull-up transistor to turn on the active clamp FET 238. Additional details of the secondary-side controller 216 are described below with respect to FIGS. 3A-5B.

As illustrated in FIG. 2, the primary-side controller 214 can include a first receiver 241 (e.g., ACF Rx) to receive a first signal at a first signal level, such as a first pulse 226 corresponding to the first pulse 234, from dual-level pulse transformer 230. The first pulse 226 can control at least the active clamp FET 238. The primary-side controller 214 includes a second receiver 243 (e.g., primary Rx) to receive a second signal at a second signal level, such as a second pulse 228 corresponding to the second pulse 236, from dual-level pulse transformer 230. The second pulse 228 can control at least the primary-side FET 210. In another embodiment, a single receiver can receive the first signal (e.g., first pulse 226) and the second signal (e.g., second pulse 228).

In at least one embodiment, a first resistor 251 is coupled between the capacitor 240 and the first-level signal generator 231, and a second resistor 253 is coupled between the capacitor 240 and the second-level signal generator 233. In at least one embodiment, the first and second resistors 251, 253 are internal to an integrated circuit of the secondary-side controller 216. In another embodiment, the first and second resistors 251, 253 are external to the integrated circuit of the secondary-side controller 216. In at least one embodiment, the first and second resistors 251, 253 are resistor components. In other embodiments, the first and second resistors 251, 253 can be any resistive elements. In at least one embodiment, the resistance of the first and second resistors 251, 253 are different values to generate the two different levels. In another embodiment, the two different levels are generated by the a single signal source. Additional details of the secondary-side controller 216 are described below with respect to FIGS. 3A-5B. 5.

Figure 3A:
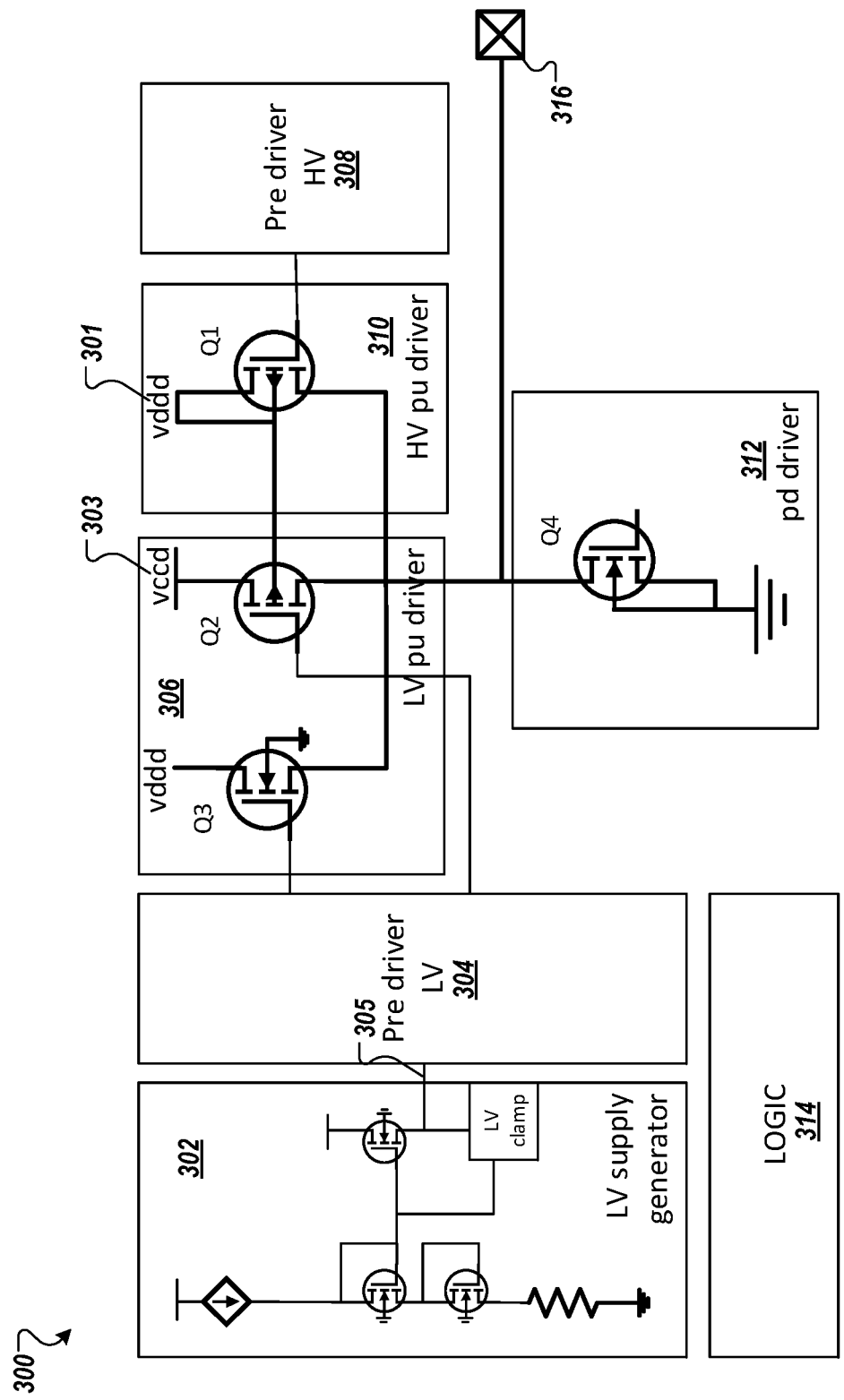
FIG. 3A is a block diagram of driver circuity with a first dual-level pulse transformer drive scheme according to at least one embodiment.

FIG. 3A is a block diagram of driver circuitry 300 with a first dual-level pulse transformer drive scheme according to at least one embodiment. The first dual-level pulse transformer drive scheme can be an amplitude modulation-based drive scheme. In the dual-level pulse transformer drive scheme, a lower voltage level (LV) can be used to send information about ACF FET turn on and off via a dual-level pulse transformer (not illustrated in FIG. 3A). A higher voltage level can be used to send information about primary-side FET turn on and off via the same dual-level pulse transformer. There are no additional components needed to send information for controlling the ACF FET and the primary-side FET.

In at least one embodiment, the driver circuitry 300 has two voltage supplies used on a driver to do amplitude modulation. In this scheme, two supplies with different voltage levels are used for driving two levels on the pulse transformer. For example, an HV supply 301 can use a first chip supply Vddd (e.g., 3V-5V) for the HV level, and an LV supply 303 can use a second chip supply Vccd (e.g., 1.65V-1.95V), or an internally generated supply, for the LV level.

In at least one embodiment, the driver circuitry 300 includes a first supply generator 302, a LV pre-driver 304, a LV pull-up driver 306, a HV pre-driver 308, a HV pull-up driver 310, and a pull-down driver 312. The first supply generator 302 (e.g., LV supply generator) can generate a clamped LV 305 for use by the LV pre-driver 304. The LV pre-driver 304 can activate the LV pull-up driver 306, such as by applying a control signal at a gate of a pull-up transistor coupled between the LV supply 303 (e.g., second chip supply Vccd) and an output terminal 316. The HV pre-driver 308 can activate the HV pull-up driver 310, such as by applying a control signal at a gate of a pull-up transistor coupled between the HV supply 301 (e.g., first chip supply Vddd) and the output terminal 316. In at least one embodiment, logic 314 can be used to control the LV pre-driver 304 and the HV pre-driver 308. The logic 314 can be part of the secondary-side controller that controls the active clamp FET and the primary-side FET using the driver circuitry 300.

In this first drive scheme of driver circuitry 300, a ground to HV (Vddd) switching with a first-level pulse, HV +ve level pulse, turns ON the primary-side FET. A HV (Vddd) to ground switching with a first-level pulse, LV −ve level pulse, turns OFF the primary-side FET. A ground to LV (Vccd) switching with a second-level pulse, LV +ve level, turns ON the active clamp FET. A LV (Vccd) to ground switching with a second-level pulse, LV −ve level, turns OFF the active clamp FET.

Figure 3B:
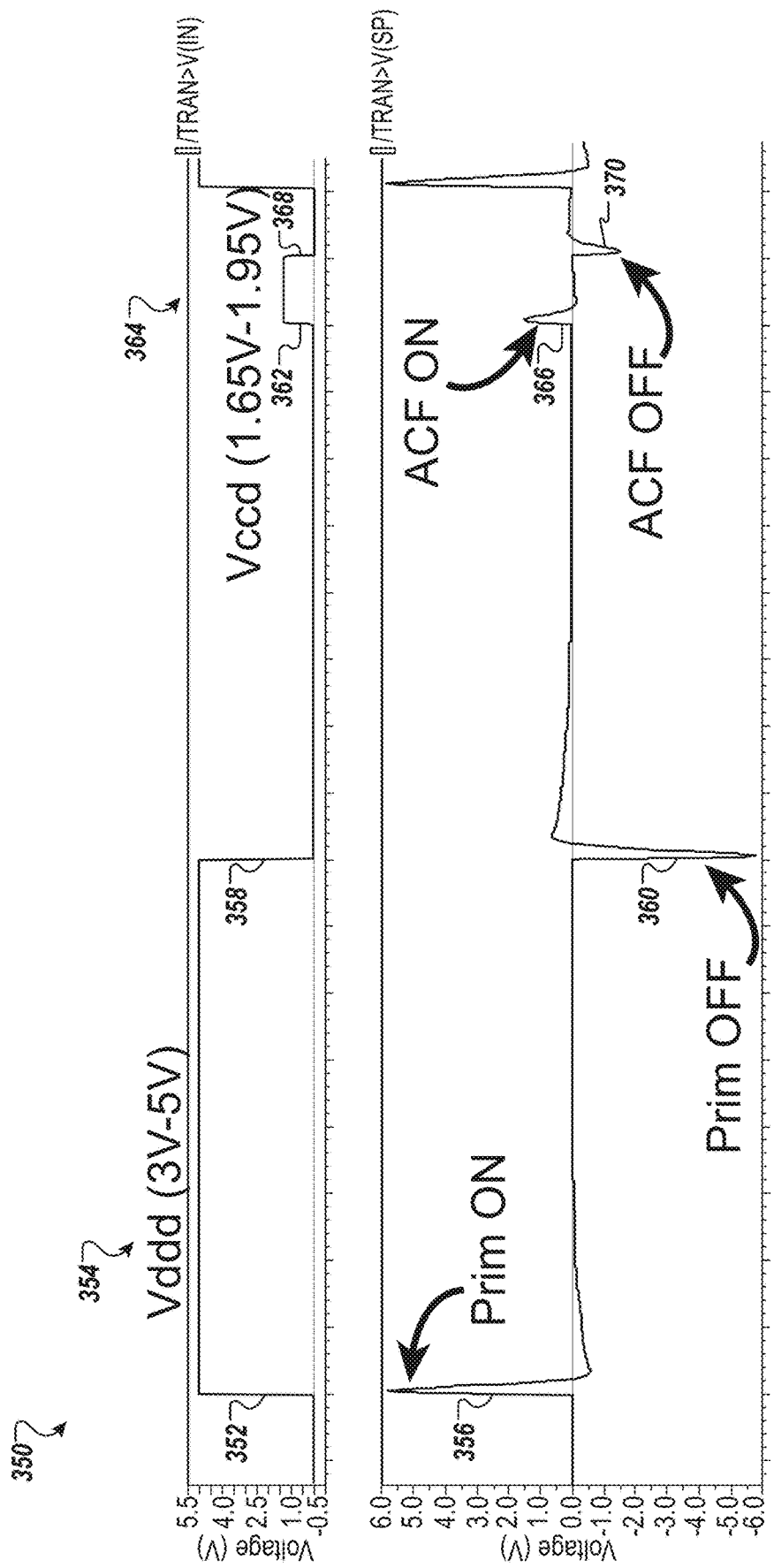
FIG. 3B is a graph illustrating pulses of the driver circuity with the first dual-level pulse transformer drive scheme of FIG. 3A according to at least one embodiment.

FIG. 3B is a graph 350 illustrating pulses of the driver circuity 300 with the first dual-level pulse transformer drive scheme of FIG. 3A according to at least one embodiment. As illustrated in graph 350, a first edge 352 between zero and a first level (e.g., Vddd) of a first square wave pulse 354, generated by the HV pull-up driver 310, turns on the primary-side FET using a first pulse 356. A second edge 358 between the first level (e.g., Vddd) and zero of the first square wave pulse 354 turns off the primary-side FET using a second pulse 360. A first edge 362 between zero and a second level (e.g., Vccd) of a second square wave pulse 364, generated by the LV pull-up driver 306, turns on the active clamp FET using a third pulse 366. A second edge 368 between the second level (e.g., Vccd) and zero of the second square wave pulse 364 turns off the active clamp FET using a fourth pulse 370.

Figure 4A:
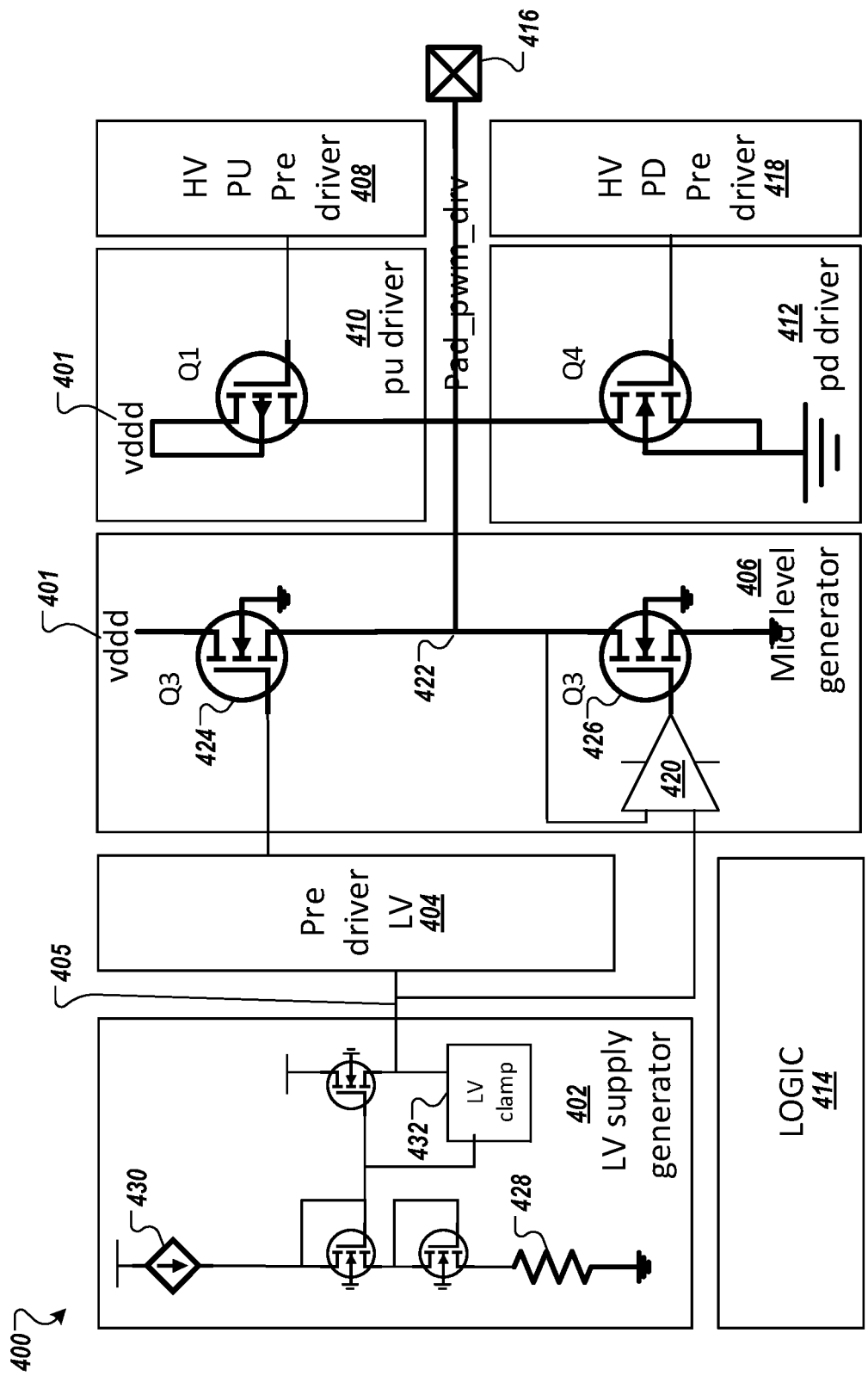
FIG. 4A is a block diagram of driver circuity with a second dual-level pulse transformer drive scheme according to at least one embodiment.

FIG. 4A is a block diagram of driver circuity 400 with a second dual-level pulse transformer drive scheme according to at least one embodiment. The driver circuitry 400 with the second dual-level pulse transformer drive scheme can use a single HV supply 401 (e.g., Vddd 3V-5V) for amplitude modulation. In particular, the second drive scheme can use a middle level (or mid-level), created using a programmable voltage supply, Vddd-IR, for driving two levels on the dual-level pulse transformer.

In the dual-level pulse transformer drive scheme of driver circuitry 300, a lower voltage level (LV) can be used to send information about ACF FET turn on and off via a dual-level pulse transformer (not illustrated in FIG. 4A). A higher voltage level can be used to send information about primary-side FET turn on and off via the same dual-level pulse transformer. There are no additional components needed to send information for controlling the ACF FET and the primary-side FET.

In at least one embodiment, a HV supply 401 of the driver circuitry 400 can use a first chip supply Vddd (e.g., 3V-5V) for the HV level, and a mid-level generator 406 can generate an LV supply for the LV level.

In at least one embodiment, the driver circuitry 400 includes a first supply generator 402, a LV pre-driver 404, the mid-level generator 406, a HV pull-up pre-driver 408, a HV pull-up driver 410, a HV pull-down pre-driver 418, and a pull-down driver 412. The first supply generator 402 (e.g., LV supply generator) can generate a clamped LV 405 for use by the LV pre-driver 404 and the mid-level generator 406. The LV pre-driver 404 can activate the mid-level generator 406, such as by applying a control signal at a gate of a pull-up transistor coupled between the HV supply 301 (e.g., first chip supply Vdd) and an output terminal 416. The HV pull-up pre-driver 408 can activate the HV pull-up driver 410, such as by applying a control signal at a gate of a pull-up transistor coupled between the HV supply 401 (e.g., first chip supply Vddd) and the output terminal 416. The HV pull-down pre-driver 418 can activate the pull-down driver 412, such as by applying a control signal at a gate of a pull-down transistor coupled between the output terminal 416 and ground. In at least one embodiment, the mid-level generator 406 includes a pull-down transistor coupled between the output terminal 416 and ground. A first input of an amplifier 420 is coupled to the first supply generator 402 to receive the clamped LV 405. A second input of the amplifier 420 is coupled to the output terminal 416. The pull-down transistor is coupled between the output terminal and ground.

In at least one embodiment, logic 414 can be used to control the LV pre-driver 404, the HV pull-up pre-driver 408, and the HV pull-down pre-driver 418. The logic 414 can be part of the secondary-side controller that controls the active clamp FET and the primary-side FET using the driver circuitry 400.

In this second drive scheme, a single pulse, −ve level, is used for switching off active clamp FET or primary-side FET. A ground to HV (Vddd) switching with a first-level pulse, HV +ve level pulse, turns ON the primary-side FET. A mid-level to HV (Vddd) switching with a second-level pulse, LV +ve level pulse, turns ON the active clamp FET. A HV (Vddd) to mid-level switching with a second pulse, LV −ve level, turns the active clamp FET OFF or primary-side FET OFF. The second drive scheme can provide a reliable, clamped mid-level voltage as an HV ground level.

It should be noted that the communication of a multi-level code on a single transformer carries a risk of mis-communication. For example, an LV level (mid-level in FIG. 4A) can be interpreted as an HV level. This can be further aggravated with the resonance phenomenon of the transformer. A mid-level clamped voltage 405 is generated to eliminate this effect by controlling the amplitude voltage level of the pulse, −ve, for the primary switch to turn off. It can ensure that a positive pulse, +ve LV or +ve HV signal, is always after a negative pulse, −ve LV or −ve HV signal.

In at least one embodiment, the mid-level voltage is programmable and can be varied to increase the noise margin between HV and LV signaling, as well as the resonance to LV signaling. In at least one embodiment, a calibration loop from the secondary side can be used to set or program an LV peak. A mid-level voltage can be varied during calibration, and an LV drive signal is asserted while the response is measured on the secondary drain using a zero-crossing detector (ZCD). This programmable value can provide a larger margin between HV and LV levels. The programmability can be used to account for variations in the transformer or die. The embodiments described herein can be used in the AC-DC secondary-side controller of a flyback controller and can help improve the reliability and efficiency of the flyback controller.

In at least one embodiment, the first supply generator 402 is a programmable reference supply generator that generates a programmable reference supply. The mid-level generator 406 (first-level signal generator) include the amplifier 420. The amplifier 420 includes a first input coupled to the programmable reference supply (e.g., 405) and a second input coupled to a common node 422 between a first pull-up transistor 424 and a first pull-down transistor 426. The mid-level generator 406 can generate and provide a reliable, clamped mid-level voltage as an HV ground level on the output terminal 416. The output of the mid-level generator 406, when activated by logic using the the LV pre-driver 404 and amplitifer 420, settles at the mid-level voltage. Similarly, when the HV pull-up driver 410 is activated by the HV pull-up pre-driver 408, the output terminal 416 increase to the HV supply 401 (Vddd). Depending on whether the active clamp is turned on or the primary-side FET, the HV pull-down pre-driver 418 can activate the pull-down driver 412. When the pull-down driver 412 is activated by the HV pull-down pre-driver 418, the output terminal 416 decreases from HV supply 401 to zero. When the pull-down driver 412 is not activated by the HV pull-down pre-driver 418 and the mid-level generator 406 is enabled, the output terminal 416 will be at the mid-level (e.g., HV ground level).

In at least one embodiment, the first supply generator 402 includes a resistor 428, a programmable current source 430 coupled in series with the resistor 428, and a voltage clamp 432. The voltage clamp 432 is coupled between a node between the resistor 428 and the programmable current source. The voltage clamp 432 can provide a clamped voltage 405 at a third signal level to the LV pre-driver 404 and the mid-level generator 406.

Figure 4B:
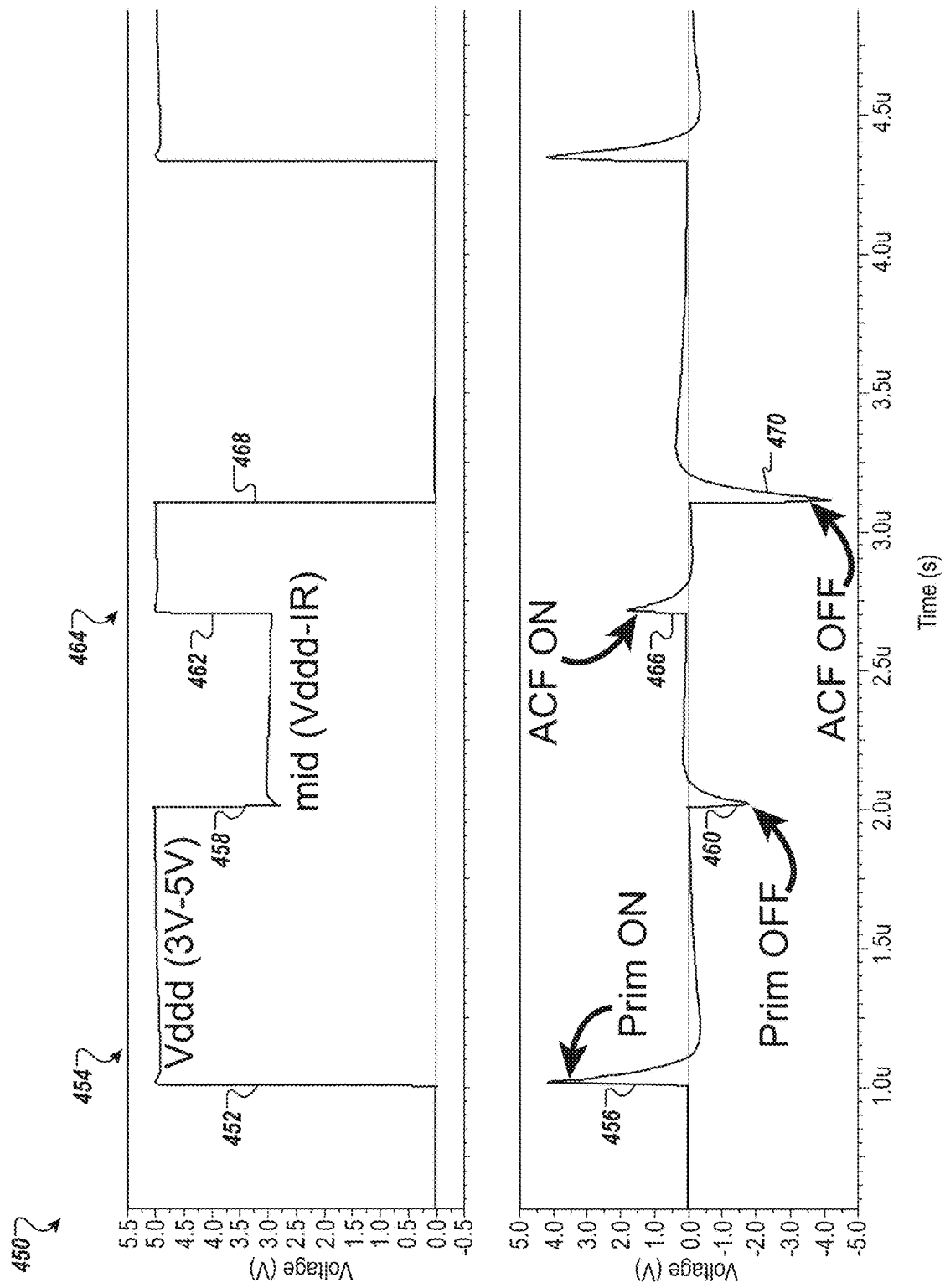
FIG. 4B is a graph illustrating pulses of the driver circuitry with the second dual-level pulse transformer drive scheme of FIG. 4A according to at least one embodiment.

FIG. 4B is a graph 450 illustrating pulses of the driver circuitry 400 with the second dual-level pulse transformer drive scheme of FIG. 4A according to at least one embodiment. As illustrated in graph 450, a first edge 452 between zero and a first level (e.g., Vddd of 5v) of a first square wave pulse 454, generated by the HV pull-up driver 410, turns on the primary-side FET using a first pulse 456. A second edge 458 between the first level (e.g., Vddd of 5v) and the mid-level (e.g., 3v) of the first square wave pulse 454 turns off the primary-side FET using a second pulse 460. A first edge 462 between the mid-level and the first level (e.g., Vddd of 5v) of a second square wave pulse 464, generated by the mid-level generator 406, turns on the active clamp FET using a third pulse 466. A second edge 468 between the first level (e.g., Vddd) and zero of the second square wave pulse 464 turns off the active clamp FET using a fourth pulse 470.

Figure 5A:
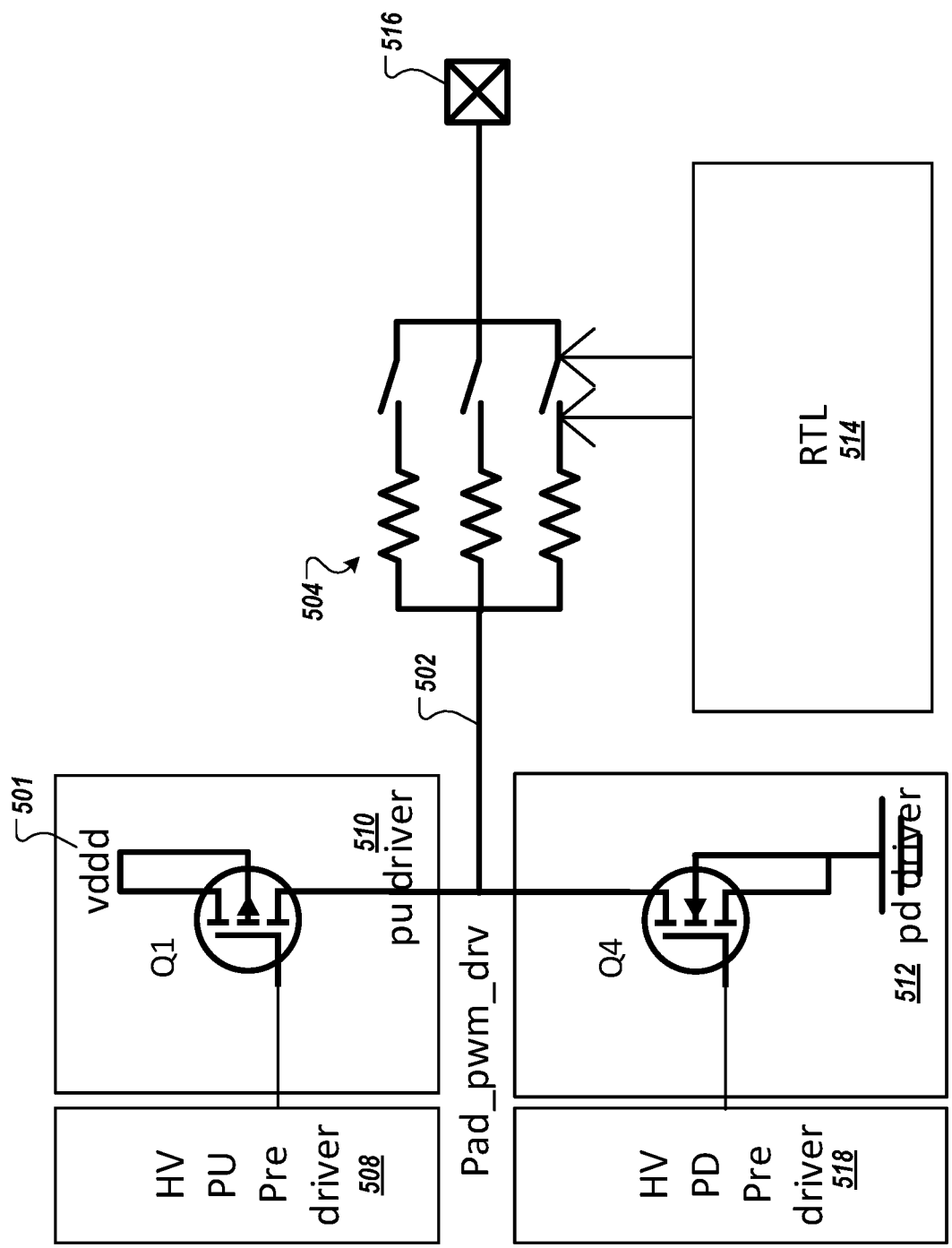
FIG. 5A is a block diagram of driver circuity with a third dual-level pulse transformer drive scheme according to at least one embodiment.

FIG. 5A is a block diagram of driver circuity 500 with a third dual-level pulse transformer drive scheme according to at least one embodiment. The driver circuitry 500 with the third dual-level pulse transformer drive scheme can use a single supply (e.g., Vddd 3V-5V) and variable series resistors for amplitude modulation. In particular, the third drive scheme can use a single driver (e.g., a pull-up transistor and a pull-down transistor) and achieve amplitude modulation by changing the series resistors to drive two levels of the dual-level pulse transformer. The series resistors can be programmable.

In the dual-level pulse transformer drive scheme of driver circuitry 500, a lower voltage level (LV) can be used to send information about ACF FET turn on and off via a dual-level pulse transformer (not illustrated in FIG. 5A). A higher voltage level can be used to send information about primary-side FET turn on and off via the same dual-level pulse transformer. There are no additional components needed to send information for controlling the ACF FET and the primary-side FET.

In at least one embodiment, a HV supply 501 of the driver circuitry 500 can use a first chip supply Vddd (e.g., 3V-5V) for the HV level, and the series resistors can generate a first level for the HV level and a second level for the LV level.

In at least one embodiment, the driver circuitry 500 includes a HV pull-up pre-driver 508, a HV pull-up driver 510, a HV pull-down pre-driver 518, and a HV pull-down driver 512. The HV pull-up pre-driver 508 can activate the HV pull-up driver 510, such as by applying a control signal at a gate of a pull-up transistor coupled between the HV supply 501 (e.g., first chip supply Vddd) and a common node 502 coupled to a set of series resistors 504 coupled to an output terminal 516. The HV pull-down pre-driver 518 can activate the HV pull-down driver 512, such as by applying a control signal at a gate of a pull-down transistor coupled between the common node 502 and ground. In at least one embodiment, logic 514 can control which of the set of series resistors 504 is coupled between the common node 502 and the output terminal 516 to drive either a first signal at a first signal level (HV) or a second signal at a second level (LV), or vice versa. In at least one embodiment, logic 514 can be used to control the HV pull-up pre-driver 508 and the HV pull-down pre-driver 518. The logic 514 can be part of the secondary-side controller that controls the active clamp FET and the primary-side FET using the driver circuitry 500.

In this scheme, a single driver with Vddd drive level is used, and the amplitude modulation is achieved by changing the series resistor (programmable) to drive two levels on the dual-level pulse transformer (not illustrated in FIG. 5A). The driver toggles to HV (Vddd) and the change in resistance changes the amplitude at the output terminal. The ground to HV (Vddd) switching for HV +ve level with a first resistance, turns on the primary-side FET. The HV (Vddd) to ground switching for -ve level with the first resistance, turns off the primary-side FET. The ground to HV (Vdd) switching for LV +ve level with a second resistance higher than the first resistance, turns on the active clamp FET. The HV (Vddd) to ground switching for -ve level with the second resistance, turns off the active clamp FET.

In at least one embodiment, the HV and LV levels can be dynamic. The maximum and minimum values for HV and LV can be dynamically altered to reduce ringing on the transformer output, increase the noise margin between LV and HV peak, or the like. The HV and LV levels can be programmable. In at least one embodiment, a calibration loop from secondary-side controller can be set to program the LV peak level just sufficient (with margin) to be detected properly by the primary-side controller, giving more margin between HV and LV levels. This can be used to account for transformer or die variations.

Figure 5B:
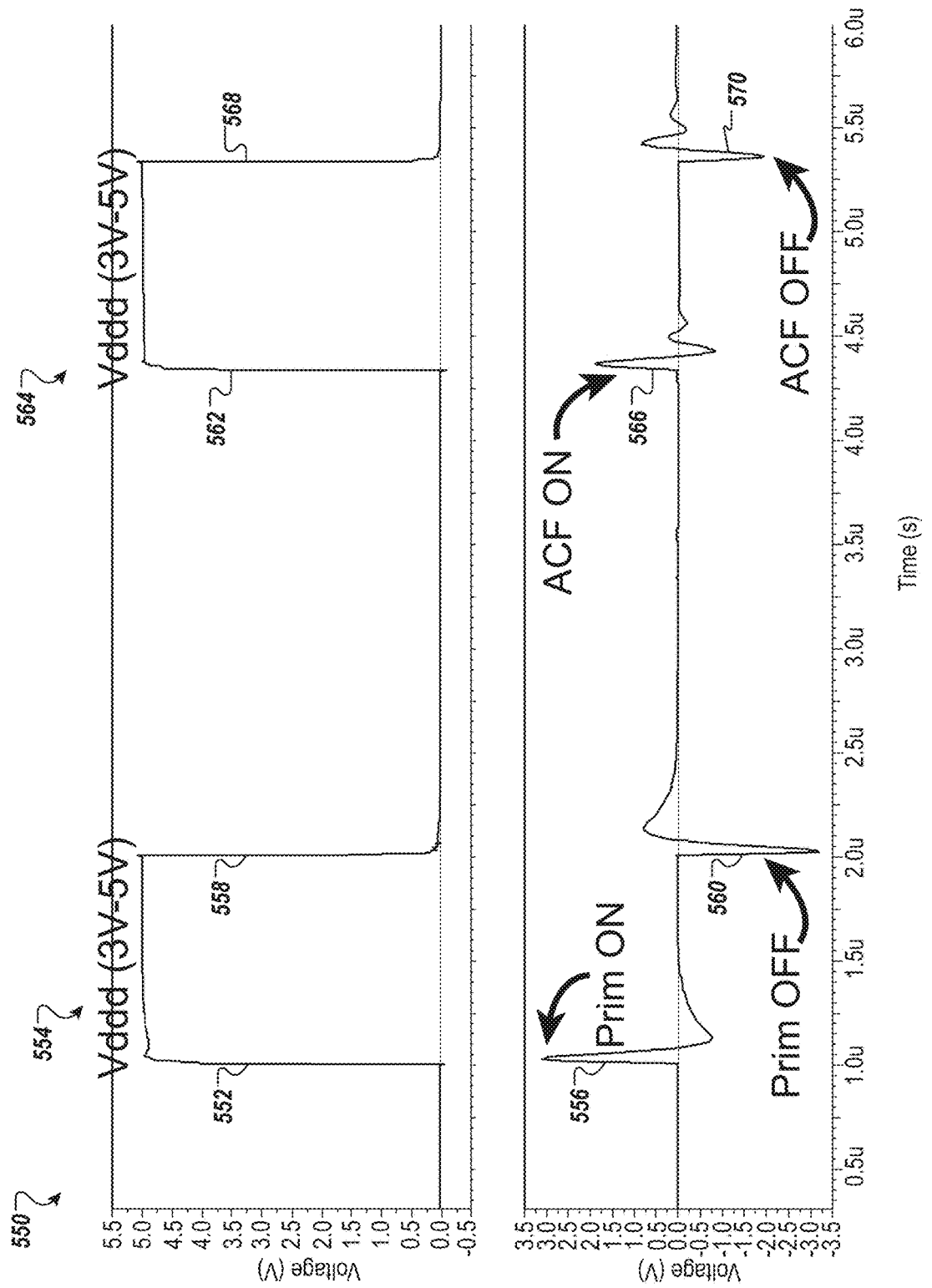
FIG. 5B is a graph illustrating pulses of the driver circuity with the third dual-level pulse transformer drive scheme of FIG. 5A according to at least one embodiment.

FIG. 5B is a graph 550 illustrating pulses of the driver circuity 500 with the third dual-level pulse transformer drive scheme of FIG. 5A according to at least one embodiment. As illustrated in graph 550, a first edge 552 between zero and a first level (e.g., Vddd of 5v) of a first square wave pulse 554, generated by the HV pull-up driver 510 with the first resistance, turns on the primary-side FET using a first pulse 556. A second edge 558 between the first level (e.g., Vddd of 5v) and ground of the first square wave pulse 554 turns off the primary-side FET using a second pulse 560. A first edge 562 between the ground and the first level (e.g., Vddd of 5v) of a second square wave pulse 464, generated by the logic 514 with the second resistance, turns on the active clamp FET using a third pulse 566. A second edge 568 between the first level (e.g., Vddd) and zero of the second square wave pulse 564 turns off the active clamp FET using a fourth pulse 570.

In another embodiment, two drivers with different internal or external components with a single receiver and a single pulse transformer can be used. In at least one embodiment, the single supply can use the first chip supply, Vddd (e.g., 3V-5V). Two identical tri-state-able drivers (e.g., general-purpose input-output (GPIO) can be used where one has a lower series resistor for HV levels and the other with a higher series resistor for LV levels. These resistors can be internal to the die with a single terminal (Ptdriver pin). These resistors can be external to the die with two terminals (two Ptdriver pins).

The embodiments described herein can provide flexibility and programmability. For example, based on transformer and external components, a mid level voltage and a LV peak voltage level can be programmed. The embodiments described herein can achieve higher efficiency with a minimum ACF-to-primary and primary-to-minimum ACF signaling. In some embodiments, since both signals are going through the same transformer, any non-linearity in the signaling is absorbed. In other embodiments, calibration of the mid-level or LV peak voltages can provide reliable performance. As described herein, there can be savings on components and pins, both on the driver and receiver sides, and no additional external devices or an extra transformer are needed for ACF and primary modes. In some embodiments, the same chip can work for the conventional flyback converter by just disabling the LV level (ACF level) using firmware for backward compatibility. Also, no additional external components are required, and no modification on the board is required to convert a conventional flyback convert to support ACF with respect to the dual-level pulse transformer scheme.

FIG. 6A is a block diagram of a circuit of an active clamp N-channel field-effect transistor (NFET) circuitry that is controlled from the secondary side by a secondary-side controller 116 which can send a control signal over a dual-level pulse transformer 130, described above in reference to FIG. 1. In one embodiment, the active clamp FET 604*a* may be an NFET (also referred to as n-type FET). The active clamp FET 604*a* is coupled to a flyback converter 602 and to a capacitor 608 which serves as a DC block in the active clamp FET circuitry. In this embodiment, the active clamp NFET 604*a* has a floating ground (e.g., the source node of the active clamp FET 604*a* is not connected to a referenced voltage). The active clamp NFET 604*a* is switched on with a positive gate-source voltage and may be implemented in most circuits. The control signal, sent from the secondary-side controller 116 via the dual-level pulse transformer 130, is input into the active clamp NFET 604*a* through the input line (142). Because the source node of the active clamp NFET 604*a* is a floating node, the active clamp NFET 604*a* can be driven by an opto-coupler, a capacitive isolator, a pulse transformer, as described herein.

FIG. 6B is a block diagram of an active clamp P-channel field effect transistor (PFET) circuitry that is controlled from the secondary side by a secondary-side controller 116 which can send a control signal over the dual-level pulse transformer 130, described above in reference to FIG. 1. Using the dual-level pulse transformer 130, the secondary-side controller 116 can send the control signal over a galvanic isolation barrier. In other embodiments, the secondary-side controller 116 can send a control signal directly to the PFET circuitry, instead of over a galvanic isolation barrier. The active clamp FET 604b is coupled to the flyback converter 602 and to a capacitor 608 which serves as a DC block in the active clamp circuitry. In this embodiment, the active clamp PFET 604b (also referred to as p-type FET) has a referenced ground (e.g., the source node of the active clamp FET is connected to a referenced voltage). Since the ground of the active clamp PFET 604b is not floating, this circuitry suffers less from electromagnetic interference (EMI) issues.

In other embodiments, the active clamp may be another type of transistor, e.g., an insulated-gate bipolar transistor (IGBT), or the like.

In at least one embodiment, the dual-level pulse transformers described herein can be used in a USB-PD power adapter with a pulse transformer, a flyback transformer, or both. The USB-PD power adapter includes a primary IC controller and a secondary IC controller. The secondary IC controller of the USB-PD power adapter further controls an active clamp FET via a second pulse transformer. The second pulse transformer can be a dual-level pulse transformer described herein The secondary IC controller may be disposed in a chip package and includes a USB-PD subsystem configured in accordance with the techniques for gate driver control described herein. The secondary IC controller is configured to negotiate a PD contract with a consumer device (not shown) attached to USB Type-C port and to control through an output pin ("PWM_DRV") the required VBUS voltage that is output from flyback transformer. USB Type-C port is typically associated with a Type-C plug, but it should be understood that in various embodiments the USB Type-C port may be associated with a Type-C receptacle instead. The flyback transformer is coupled to a rectified DC power source and the output can be coupled to a secondary-side FET (e.g., SR_FET 112). The VBUS_IN is regulated by an error amplifier which is connected to a compensation network. The compensation network can be a resistor-capacitor (RC) circuit specific to the design of the USB-PD power adapter. The compensation network can be coupled to receive a feedback signal from a first output pin ("FB") of the secondary IC controller. The compensation network can also be coupled to a second output pin ("EA_out)" and a third output pin ("CC_Comp"). The flyback transformer can be coupled to a large bulk capacitor, and an active clamp circuit, and a DC-blocking capacitor. The USB-PD power adapter may also include the dual-level pulse transformer for communicating information across an isolation barrier The secondary IC controller can be coupled to VBUS line is configured to control the operation and state of power switches (such as power switch) when fault conditions are detected by providing control signals to the gate of the switches. VBUS line includes provider switch configured as an on/off switch device controlled by signals from an output pin ("VBUS_Control") of a gate driver in the secondary IC controller. The power switch may correspond to a provider FET described herein. On one side of provider switch, a power source node on the VBUS line is coupled to second winding of the flyback transformer, which is coupled to a large bulk capacitor configured to remove the AC component of the power signal. A power source node is coupled to an input pin ("VBUS_IN") of the secondary IC controller. On the other side of power switch, an output node on the VBUS line is coupled to USB Type-C port. Output node is coupled to another input pin ("VBUS_C") of the secondary IC controller. The GND terminal of USB Type-C port is coupled to a secondary-side FET.

In operation, the direction of power flow on VBUS line is from the flyback transformer to a consumer device, such as a laptop computer (not shown), that is attached to USB Type-C port. When a PD contract with the consumer device is negotiated, the secondary IC controller turns on the provider switch to provide power to the consumer device at the negotiated voltage and/or current level(s). A high-to-low voltage transition on VBUS line may be needed when the PD contract is dynamically re-negotiated to lower the VBUS voltage and/or current, e.g., when the consumer device has finished charging its battery and now needs power only to operate.

On detection of fault conditions, a control signal may be sent to turn off the provider switch, thereby disconnecting the USB Type-C port from the flyback transformer. The provider switch is turned off by driving the output of VBUS_Control to zero. This disconnection may be caused by an over-voltage condition, an over-current condition, or other conditions that may require disconnection of the USB Type-C port from the flyback transformer for protection of circuits coupled to the USB Type C port.

As noted above, the USB-PD power adapter permits communications over the isolation barrier, the isolation barrier of the dual-level pulse transformer, or all in a similar manner as described above with respect to FIGS. 1-6B. In particular, an SR driver circuit of the secondary IC controller can output a signal on an output pin ("SR_DRV") to communicate a control signal across the isolation barrier of the dual-level pulse transformer. As noted herein, SR driver circuit can be other driver circuits that create pulses on the output pin to communicate information across the isolation barrier of the dual-level pulse transformer. The control signal transmitted across the dual-level pulse transformer can be used to control active clamp FET and the primary-side FET, as decribed herein.

In another embodiment, an AC-DC power adapter device includes a flyback converter (with a flyback transformer) or an isolated power converter that is coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller coupled to the flyback transformer and a secondary-side controller coupled to the flyback transformer. A primary-side power switch (also referred to as a primary-side FET or primary-side FET) and an active clamp FET are coupled to a primary winding of the flyback transformer and the primary-side controller. A secondary-side power switch (also referred to as a secondary-side FET or secondary FET) is coupled to a secondary winding of the flyback transformer and the secondary-side controller. The primary-side controller is configured to receive a first signal from the secondary-side controller across a galvanic isolation barrier and apply a second signal to the primary-side power switch in response to the first signal to turn-on and turn-off the primary-side power switch. The primary-side controller is configured to receive a third signal from the secondary-side controller across the same galvanic isolation barrier and apply a fourth signal to the active clamp FET in response to the third signal to turn-on and turn-off the active clamp FET. The secondary-side controller is also configured to communicate information to the primary-side controller via a dual-level pulse transformer coupled between the primary-side controller and the secondary-side controller. The secondary-side controller is also configured to send a control signal across a second pulse transformer coupled between the secondary-side controller and the active clamp FET to control the active clamp FET. In at least one embodiment, the control signal that is sent by the secondary-side controller is the same control signal that is used to control the secondary-side FET. Also, the active clamp FET (ACF) control signal can be an independent signal where the duration of the active clamp FET can be controlled irrespective of a control signal sent to secondary-side FET. That is, a multi-level signal can control the switching of the active clamp FET (e.g., the duration that the active clamp FET is ON and the duration that the active clamp FET is OFF) and the multi-level control signal can separately control the secondary-side FET. In another embodiment, all three FETS can be driven by three independent control signals. It should be noted that the two indendent control signals sent to the primary side are sent over the same galvanic isolation barrier using the same dual-level pulse transformer.

In a further embodiment, the primary-side controller includes a first pulse receiver and a first driver for the primary-side FET and a second pulse receiver and a second driver for the active clamp FET. The first pulse receiver receives the first signal from the secondary-side controller across the galvanic isolation barrier. The first signal includes a first turn-on pulse to turn on the primary-side power switch and a first turn-off pulse to turn off the primary-side power switch. In response, the first driver, which is coupled to the first pulse receiver and the primary-side power switch (e.g., the primary-side FET), applies the first turn-on pulse and the first turn-off pulse to the primary-side power switch. The second pulse receiver receives the second signal from the secondary-side controller across the galvanic isolation barrier. The second signal includes a first turn-on pulse to turn on the active clamp FET and a first turn-off pulse to turn off the active clamp FET. In response, the second driver, which is coupled to the second pulse receiver and the active clamp FET, applies the first turn-on pulse and the first turn-off pulse to the active clamp FET.

In a further embodiment, the AC-DC power adapter device includes a first pulse transformer coupled between the primary-side controller and the secondary-side controller. The primary-side controller is configured to receive the first and second signals from the secondary-side controller as one or more pulses via the dual-level pulse transformer. The primary-side controller can detect when the secondary-side controller is communicating information via the first pulse transformer as described herein.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, SBPD device is USB-PD device that is compatible with the USB-PD standard or more generally with the USB standard. For example, SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The SBPD device may include a power converter (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OV, UV, over-current protection (OCP), short circuit protection (SCP), PFC, SR, or the like. The information can include fault information for any of these different functions.

In other embodiments, the SBPD device is connected to power source, such as a wall socket power source that provides AC power. In other embodiments, power source may be a different power source, such as a battery, and may provide DC power to SBPD device. The power converter may convert the power received from power source (e.g., convert power received to Vbus_in). For example, power converter may be an AC-DC converter and convert AC power from power source to DC power. In some embodiments, power converter is a flyback converter, such as a secondary-controlled flyback converter, that provides galvanic isolation between the input (e.g., primary side) and the output (e.g., secondary side).

In some embodiments, the SBPD device provides Vbus_c to a sink device (e.g., via communication channel (CC) specifying a particular output voltage, and possibly an output current). SBPD device may also provide access to ground potential (e.g., ground) to the sink device. In some embodiments, the providing of the Vbus_c is compatible with the USB-PD standard. Power control analog subsystem may receive Vbus_in from power converter. The power control analog subsystem may output Vbus_in. In some embodiments, power control analog subsystem is a USB Type-C controller compatible with the USB Type-C™ standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, power converter and power control analog subsystem may each be discrete ICs with separate packaging and pin configurations.

In some embodiments, the SBPD device may provide a complete USB Type-C™ and USB-Power Delivery port control solution for notebooks, dongles, monitors, docking stations, power adapters, vehicle chargers, power banks, mobile adaptors, and the like.

Embodiments when using isolation or level shifters may require some driver circuit. The driver circuit may be as simple as using a PWM output from the secondary-side controller, to drive a capacitive coupled controller or optocoupler. The driver circuit can be an elaborate structure when driving a pulse transformer.

In some embodiments, the secondary-controlled flyback converter may be a single-ended forward converter. In some embodiments, feed-forward information on the secondary side can be used to limit the maximum duty cycle that can be passed to the primary-side FET and active clamp FET. The maximum duty cycle may change with line voltage. Line voltage is derived from transformer winding. In another embodiment, Line voltage is also available from SR_Drain node on the source pin of.

Figure 7:
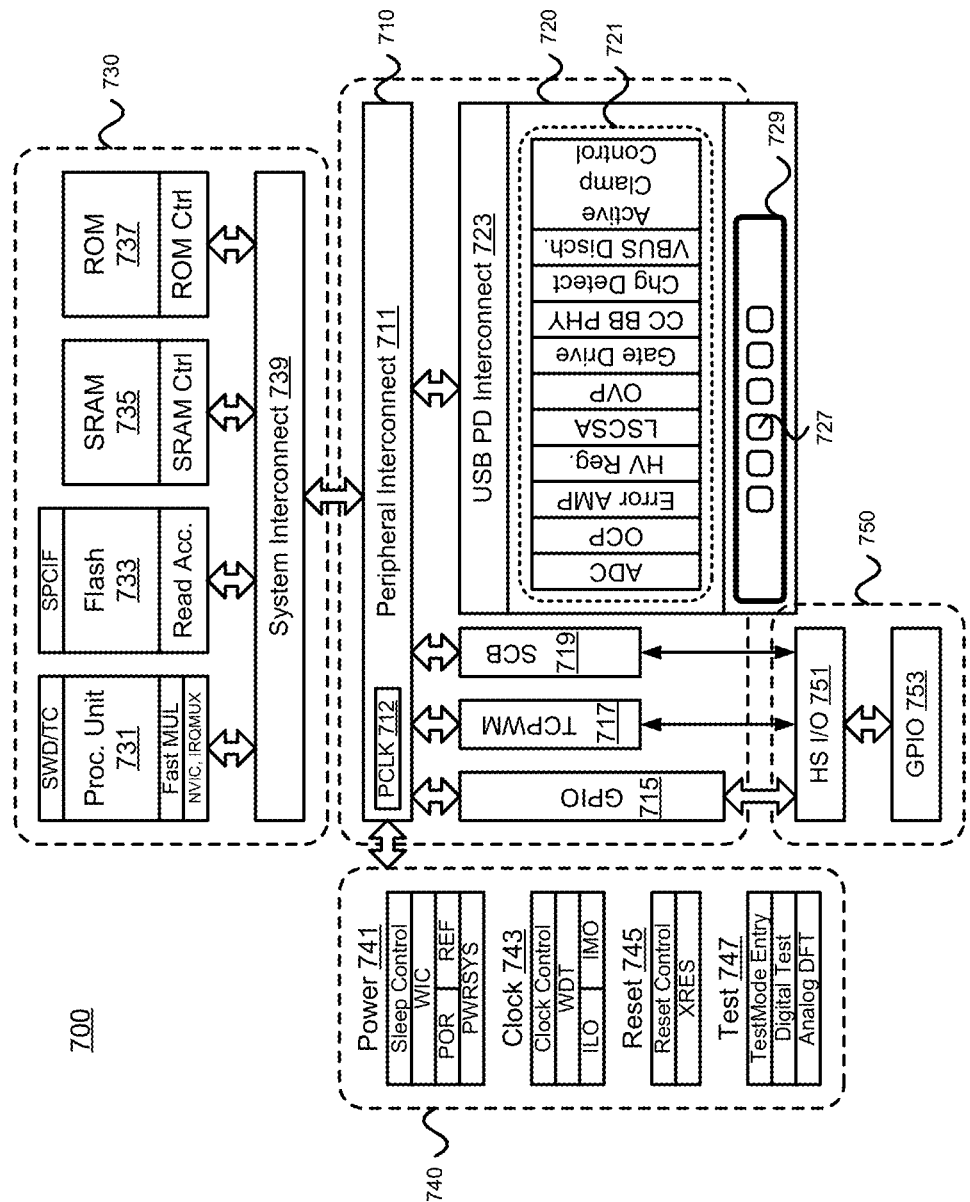
FIG. 7 is a schematic diagram of a USB-PD power adapter to send a control signal from a secondary-side controller over a galvanic isolation barrier to control an active clamp FET on the primary side, according to one embodiment.

FIG. 7 is a block diagram illustrating a system 700 for a USB device with a secondary-controlled active clamp FET for use in USB power delivery in accordance with some embodiments. System 700 may include a peripheral subsystem 710 including a number of components for use in USB Power Delivery (USB-PD). Peripheral subsystem 710 may include a peripheral interconnect 711 including a clocking module, peripheral clock (PCLK) 712 for providing clock signals to the various components of peripheral subsystem 710. Peripheral interconnect 711 may be a peripheral bus, such as a single-level or multi-level advanced high-performance bus (AHB), and may provide a data and control interface between peripheral subsystem 710, CPU subsystem 730, and system resources 740. Peripheral interconnect 711 may include controller circuits, such as direct memory access (DMA) controllers, which may be programmed to transfer data between peripheral blocks without input by, control of, or burden on CPU subsystem 730.

The peripheral interconnect 711 may be used to couple components of peripheral subsystem 710 to other components of system 700. Coupled to peripheral interconnect 711 may be a number of general purpose input/outputs (GPIOs) 715 for sending and receiving signals. GPIOs 715 may include circuits configured to implement various functions such as pull-up, pull-down, input threshold select, input and output buffer enabling/disable, single multiplexing, etc. Still other functions may be implemented by GPIOs 715. One or more timer/counter/pulse-width modulator (TCPWM) 717 may also be coupled to the peripheral interconnect and include circuitry for implementing timing circuits (timers), counters, pulse-width modulators (PWMs) decoders, and other digital functions that may operate on I/O signals and provide digital signals to system components of system 700. Peripheral subsystem 710 may also include one or more serial communication blocks (SCBs) 719 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 710 may include a USB power delivery subsystem 720 coupled to the peripheral interconnect and comprising a set of USB-PD modules 721 for use in USB power delivery. USB-PD modules 721 may be coupled to the peripheral interconnect 711 through a USB-PD interconnect 623. USB-PD modules 721 may include an analog-Attorney to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 700; a low-side current sense amplifier (LSCSA) for measuring load current accurately, an over-voltage protection (OVP) module and an OCP module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 721 may also include a charger detection module for determining that a charging circuit is present and coupled to system 700 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 720 may also include pads 727 for external connections and electrostatic discharge (ESD) protection circuitry 729, which may be required on a Type-C port. USB-PD modules 721 may also include a communication module for retrieving and communicating information, such as control signals such as from a secondary-side controller to a primary-side controller. In one embodiment, the USB-PD modules 721 include an active clamp control module in a secondary-side controller to control an active clamp FET disposed on a primary side (e.g., primary side of an AC-DC flyback converter).

GPIO 715, TCPWM 717, and SCB 719 may be coupled to an input/output (I/O) subsystem 750, which may include a high-speed (HS) I/O matrix 751 coupled to a number of GPIOs 753. GPIOs 715, TCPWM 717, and SCB 719 may be coupled to GPIOs 753 through HS I/O matrix 751.

System 700 may also include a central processing unit (CPU) subsystem 730 for processing commands, storing program information, and data. CPU subsystem 730 may include one or more processing units 731 for executing instructions and reading from and writing to memory locations from a number of memories. Processing unit 731 may be a processor suitable for operation in an integrated circuit (IC) or a system-on-chip (SOC) device. In some embodiments, processing unit 731 may be optimized for low-power operation with extensive clock gating. In this embodiment, various internal control circuits may be implemented for processing unit operation in various power states. For example, processing unit 731 may include a wake-up interrupt controller (WIC) configured to wake the processing unit up from a sleep state, allowing power to be switched off when the IC or SOC is in a sleep state. CPU subsystem 730 may include one or more memories, including a flash memory 733, and static random access memory (SRAM) 735, and a read-only memory (ROM) 737. Flash memory 733 may be a non-volatile memory (NAND flash, NOR flash, etc.) configured for storing data, programs, and/or other firmware instructions. Flash memory 733 may include a read accelerator and may improve access times by integration within CPU subsystem 730. SRAM 735 may be a volatile memory configured for storing data and firmware instructions accessible by processing unit 731. ROM 737 may be configured to store boot-up routines, configuration parameters, and other firmware parameters and settings that do not change during operation of system 700. SRAM 735 and ROM 737 may have associated control circuits. Processing unit 731 and the memories may be coupled to a system interconnect 739 to route signals to and from the various components of CPU subsystem 730 to other blocks or modules of system 700. System interconnect 639 may be implemented as a system bus such as a single-level or multi-level AHB. System interconnect 739 may be configured as an interface to couple the various components of CPU subsystem 730 to each other. System interconnect 739 may be coupled to peripheral interconnect 711 to provide signal paths between the components of CPU subsystem 730 and peripheral subsystem 710.

System 700 may also include a number of system resources 740, including a power module 741, a clock module 743, a reset module 745, and a test module 747. Power module 741 may include a sleep control module, a wake-up interrupt control (WIC) module, a power-on-reset (POR) module, a number of voltage references (REF), and a PWRSYS module. In some embodiments, power module 741 may include circuits that allow system 700 to draw and/or provide power from/to external sources at different voltage and/or current levels and to support controller operation in different power states, such as active, low-power, or sleep. In various embodiments, more power states may be implemented as system 700 throttles back operation to achieve a desired power consumption or output. For example, the secondary-side controller may access secondary electrical parameters on the secondary side. At low line and light load, the secondary-side controller may determine that the power state is such that it is not beneficial to switch on the active clamp FET. Clock module 743 may include a clock control module, a watchdog timer (WDT), an internal low-speed oscillator (ILO), and an internal main oscillator (IMO). Reset module 745 may include a reset control module and an external reset (XRES) module. Test module 747 may include a module to control and enter a test mode as well as testing control modules for analog and digital functions (digital test and analog DFT).

System 700 may be implemented in a monolithic (e.g., single) semiconductor die. In other embodiments, various portions or modules of system 700 may in implemented on different semiconductor dies. For example, memory modules of CPU subsystem 730 may be on-chip or separate. In still other embodiments, separate-die circuits may be packaged into a single "chip," or remain separate and disposed on a circuit board (or in a USB cable connector) as separate elements.

System 700 may be implemented in a number of application contexts to provide USB-PD functionality thereto. In each application context, an IC controller or SOC implementing system 700 may be disposed and configured in an electronic device (e.g., a USB-enabled device) to perform operations in accordance with the techniques described herein. In one example embodiment, a system 700 may be disposed and configured in a personal computer (PC) power adapter for a laptop, a notebook computer, etc. In another example embodiment, system 700 may be disposed and configured in a power adapter (e.g., a wall charger) for a mobile electronic device (e.g., a smartphone, a tablet, etc.). In another example embodiment, system 700 may be disposed and configured in a wall socket that is configured to provide power over USB Type-A and/or Type-C port(s). In another example embodiment, system 700 may be disposed and configured in a car charger that is configured to provide power over USB Type-A and/or Type-C port(s). In yet another example embodiment, system 700 may be disposed and configured in a power bank that can get charged and then provide power to another electronic device over a USB Type-A or Type-C port. In other embodiments, a system like system 700 may be configured with the power switch gate control circuitry described herein and may be disposed in various other USB-enabled electronic or electro-mechanical devices.

It should be understood that a system, like system 700 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 700 should be regarded in an illustrative rather than a restrictive sense.

Figure 8:
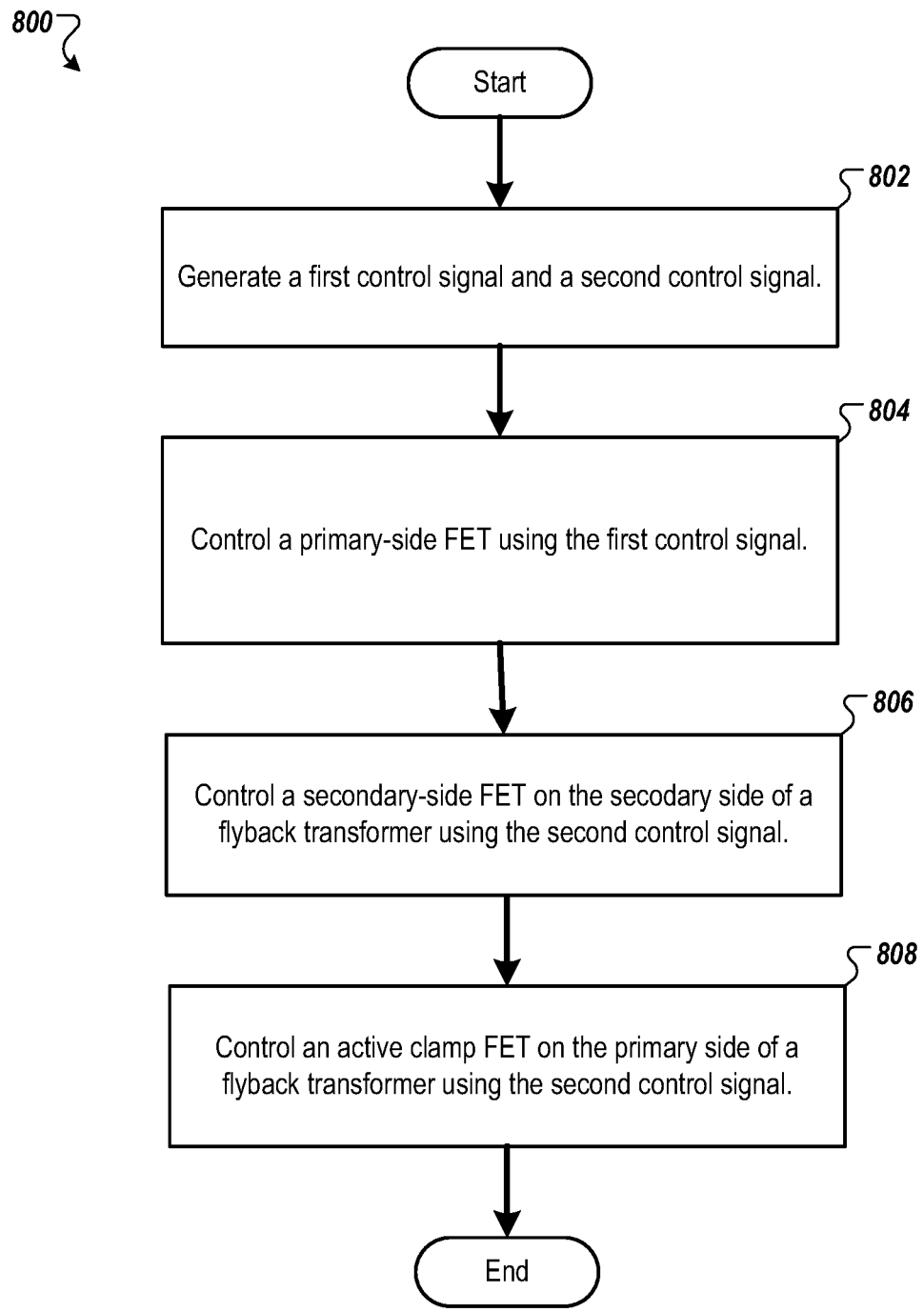
FIG. 8 is a block diagram illustrating a system for a USB device with a secondary-controlled active clamp FET and primary-side FET for use in USB power delivery in accordance with some embodiments.

FIG. 8 is a flow diagram of a method 800 of controlling an active clamp FET on a primary side across a galvanic isolation barrier by a secondary-side controller according to one embodiment. The method 800 may be performed by processing logic that comprises hardware (e.g., circuitry, dedicated logic, programmable logic, microcode, etc.), software, firmware, or a combination thereof. In one embodiment, a secondary-side controller in a secondary-controlled AC-DC flyback converter performs the method 800. In another embodiment, the secondary-side controller 116 of FIG. 1 performs the method 800. In another embodiment, the secondary-side controller 216 of FIG. 2 performs the method 800. In another embodiment, the peripheral subsystem 710 of FIG. 6 performs the method 800.

Referring to FIG. 8, the method 800 begins by the processing logic generating a first pulse of a control signal from a secondary-side controller across a galvanic isolation barrier (block 802). The processing logic sends the first pulse via a dual-level pulse transformer coupled to the secondary-side controller and the primary-side controller to a primary-side FET (e.g., a primary-side power switch) which is coupled to a flyback transformer in a secondary-controlled AC-DC flyback converter to turn-on and turn-off the primary-side power switch (block 804). The processing logic generates a second pulse of the control signal from the secondary-side controller across the galvanic isolation barrier (block 806). The processing logic sends the second pulse via the dual-level pulse transformer coupled to the secondary-side controller and the primary-side controller to an active clamp FET which is coupled to the flyback transformer and disposed on a primary side of the flyback transformer, to turn-on and turn-off the active clamp FET (block 808).

In another embodiment, the processing logic generates, using a secondary-side controller in a secondary-side controlled AC-DC flyback converter, a control signal. The processing logic controls, using the secondary-side controller, a primary-side FET coupled to a primary side of a flyback transformer of the AC-DC flyback converter using a first pulse at a first signal level based on the control signal. The processing logic controls, using the secondary-side controller, an active clamp FET on the primary side of the flyback transformer using a second pulse at a second signal level based on the control signal. The second signal level is less than the first signal level. In another embodiment, the signal levels can be reversed.

In a further embodiment, the processing logic controls the active clamp FET by sending the second pulse using a dual-level pulse transformer coupled between a primary-side controller and the secondary-side controller. The processing logic controls the primary-side FET by sending the first pulse using the dual-level pulse transformer.

In a further embodiment, the processing logic determines, using the secondary-side controller, output power on a DC output line. The processing logic activates the secondary-side FET and the active clamp FET for a first duration of time in response to determining that the output power is above a threshold. The processing logic de-activates the secondary-side FET and the active clamp FET for a second duration of time in response to determining that the output power is below the threshold.

In a further embodiment, the processing logic sends the control signal as different level pulse signals across the galvanic isolation barrier. The first level of the control signal includes pulse information to turn-on and turn-off the primary-side FET. The second level of the control signal includes pulse information to turn-on and turn-off the active clamp FET. The processing logic further sends the same second level to a secondary-side FET to control the secondary-side FET in-phase with the active clamp FET. In some cases, a first pulse receiver generates a first pulse signal with one or more pulses with a first pulse width in response to the first level pulse received from the secondary-side controller across the galvanic isolation barrier. In some cases, a second pulse receiver generates a second pulse signal with one or more pulses with a second pulse width in response to the second level pulse received from the secondary-side controller across the galvanic isolation barrier. Processing logic can vary the first pulse width or the second pulse width. In another embodiment, the processing logic generates a first PWM pulse signal at a first level and applies the first PWM pulse signal to a secondary side of a dual-level pulse transformer. Applying the first PWM pulse signal to the secondary side of the dual-level pulse transformer induces a signal on a primary side of the dual-level pulse transformer to send the first PWM pulse signal to the primary-side controller. A first pulse receiver of the primary-side controller can receive the signal on the primary side of the dual-level pulse transformer and output a control signal to a gate of the primary-side FET via a first gate driver of the primary-side controller. The multi-level control signal turns the primary-side FET on and off to control a flyback transformer of a power converter. In another embodiment, the processing logic generates a second PWM pulse signal at a second level and applies the second PWM pulse signal to the secondary side of the dual-level pulse transformer. Applying the second PWM pulse signal to the secondary side of the dual-level pulse transformer induces a signal on a primary side of the second transformer to send the second PWM pulse signal to the active clamp FET in order to drive the active-clamp FET. A second pulse receiver of the primary-side controller can receive the signal on the primary side of the dual-level pulse transformer and output a control signal to a gate of the active-clamp FET via a second gate driver of the primary-side controller.

In another embodiment, since the secondary-side controller is on the secondary side, the secondary-side controller has access to secondary electrical parameters that can be computed, including line and load information on the secondary side. For example, at low line and light load, the secondary-side controller may determine that switching on (e.g., engage) the active clamp FET is not beneficial. This may improve efficiency by minimizing unnecessary gate switching losses. Additionally or alternatively, the secondary-side controller may determine a duration of the active clamp FET based on output power and input voltage.

In another embodiment, the processing logic on the secondary-side controller uses the same control signal to control the active clamp FET on the primary side and the secondary-side FET on the secondary side. In this case, the active clamp FET and the secondary-side FET are switched in-phase, allowing the active clamp FET to stay on for the duration that the secondary-side FET is on, and not any longer. The processing logic uses a different control signal to control the primary-side FET. Since the active clamp FET is not required to stay on during the full duration that the primary-side FET is off, there is no artificial dead time required between the active clamp FET and the primary-side FET.

Figure 9:
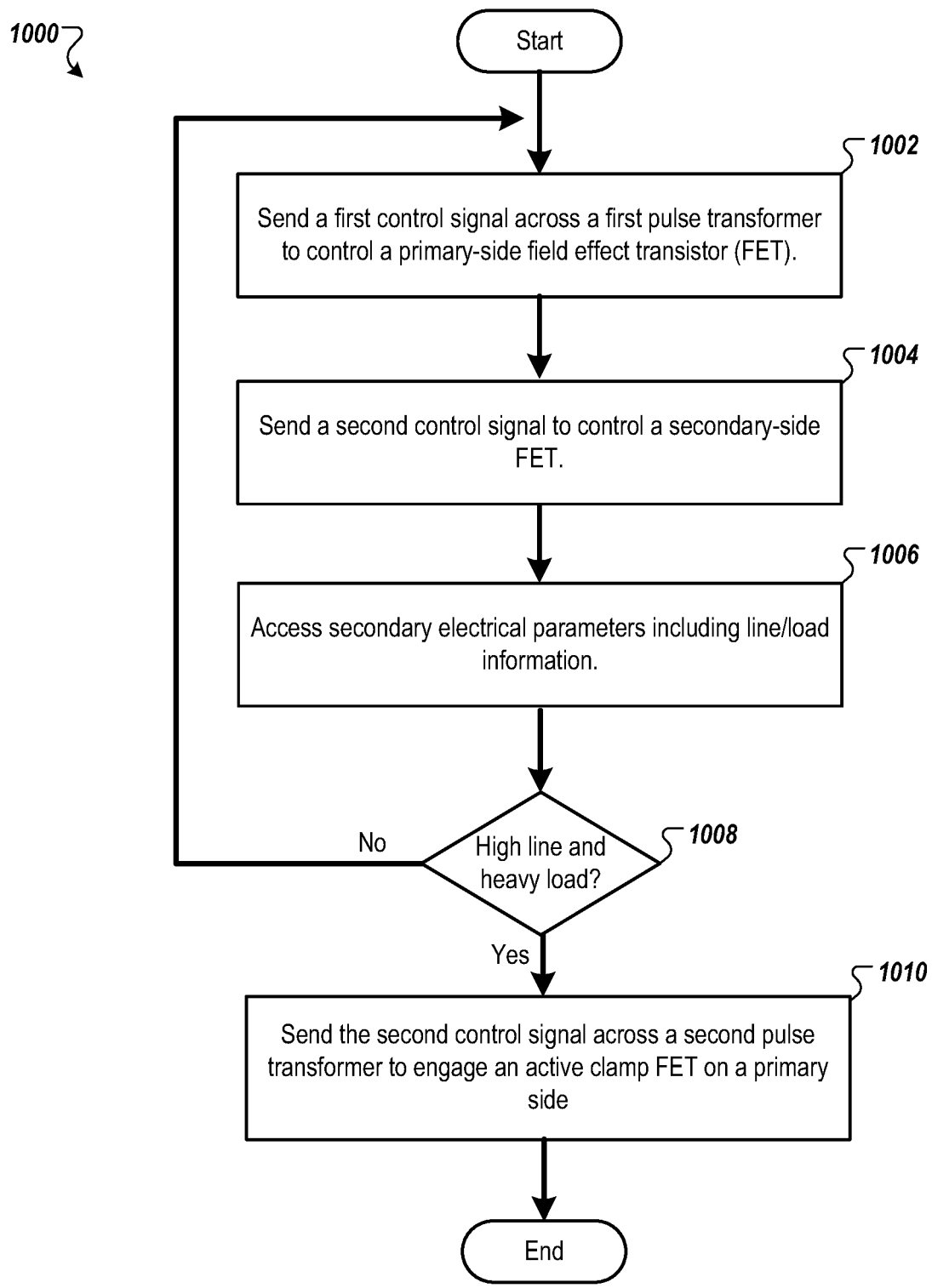
FIG. 9 is a flow diagram of a method of controlling an active clamp FET on a primary side across a galvanic isolation barrier by a secondary-side controller according to one embodiment.

FIG. 9 is a flow diagram of a method 900 of controlling an active clamp FET on the primary side and a primary-side FET with a secondary-side controller across a galvanic isolation barrier and controlling a secondary-side FET with the secondary-side controller according to another embodiment. The method 900 may be performed by processing logic that comprises hardware (e.g., circuitry, dedicated logic, programmable logic, microcode, etc.), software, firmware, or a combination thereof. In one embodiment, a secondary-side controller in a secondary-controlled AC-DC flyback converter performs the method 900. In another embodiment, the secondary-side controller 116 of FIG. 1 performs the method 900. In another embodiment, the secondary-side controller 216 of FIG. 2 performs the method 900. In another embodiment, the peripheral subsystem 710 of FIG. 7 performs the method 900.

Referring to FIG. 9, the method 900 begins by the processing logic sending a first pulse at a first level to a primary-side FET (block 902) The processing logic sends the first pulse via a dual-level pulse transformer coupled to the secondary-side controller and the primary-side controller to a primary-side FET (e.g., a primary-side power switch) which is coupled to a flyback transformer in a secondary-controlled AC-DC flyback converter to turn-on and turn-off the primary-side power switch. The processing logic accesses secondary electrical parameters including line and load information on the secondary side (block 904). The processing logic determines whether to engage an active clamp based on the secondary electrical parameters (block 906). For example, at low line and light load, the processing logic may determine that it is not beneficial to switch the active clamp FET and the active clamp FET is not engaged (e.g., the processing logic does not send the second pulse of the multi-level control signal across a second pulse transformer to the active clamp FET). Additionally or alternatively, at high line and heavy load, the processing logic may determine that switching on the active clamp FET is beneficial. In this case, the processing logic then sends a second pulse at a second level via the dual-level pulse transformer coupled to the secondary-side controller and an active clamp FET which is coupled to the flyback transformer and disposed on a primary side of the flyback transformer, to turn-on and turn-off the active clamp FET (block 908).

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts concretely. As used in this application, the term "or" is intended to mean an inclusive "or" rather than an exclusive "or." Unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. Therefore, the disclosure scope should be determined with reference to the appended claims, along with the full scope of equivalents to which such claims are entitled.

What is claimed is:

1. A secondary-side controlled alternating current to direct current (AC-DC) converter comprising:
    a primary-side field effect transistor (FET);
    a primary-side controller;
    a secondary-side FET;
    a transformer coupled to the primary-side FET and the secondary-side FET;
    an active clamp FET coupled to the primary-side FET, wherein the active clamp FET is disposed on a primary side of the transformer;
    a secondary-side controller coupled to the transformer, wherein the secondary-side controller is configured to control the active clamp FET and the primary-side FET across a same galvanic isolation barrier; and
    a dual-level pulse transformer coupled between the active clamp FET and the secondary-side controller to provide the same galvanic isolation barrier between the secondary-side controller and the primary-side controller;
    wherein the secondary-side controller is to send a first pulse at a first signal level to control the active clamp FET via the dual-level pulse transformer, wherein the secondary-side controller is to send a second pulse at a second signal level to control the primary-side FET via the dual-level pulse transformer, and wherein the second signal level is different than the first signal level.

2. The secondary-side controlled AC-DC converter of claim 1, wherein the secondary-side controller comprises:
    a programmable reference supply to provide a third signal level;
    a first-level signal generator coupled to a voltage supply and the programmable reference supply, the first-level signal generator to generate the first pulse at the first signal level; and
    a second-level signal generator coupled to the voltage supply, the second-level signal generator to generate the second pulse at the second signal level, wherein the first signal level is greater than the third signal level and less than the second signal level.

3. The secondary-side controlled AC-DC converter of claim 2, wherein:
    the first-level signal generator comprises a first pull-up transistor and a first pull-down transistor;
    the second-level signal generator comprises a second pull-up transistor and a second pull-down transistor to generate the second pulse; and
    the secondary-side controller comprises:
        a pull-up pre-driver to activate the second pull-up transistor to turn on the primary-side FET;
        a pull-down pre-driver to activate the second pull-down transistor to turn off the primary-side FET or the active clamp FET; and
        a pre-driver to activate the first pull-up transistor to turn on the active clamp FET.

4. The secondary-side controlled AC-DC converter of claim 3, wherein the first-level signal generator further comprises an amplifier comprising a first input coupled to the programmable reference supply and a second input coupled to a common node between the first pull-up transistor and the first pull-down transistor.

5. The secondary-side controlled AC-DC converter of claim 2, wherein the programmable reference supply comprises:
    a resistor;
    a programmable current source coupled to the resistor; and a voltage clamp coupled to a node between the resistor and the programmable current source, the voltage clamp to provide a clamped voltage at the third signal level.

6. The secondary-side controlled AC-DC converter of claim 1, wherein the active clamp FET is an n-type FET (NFET) comprising a floating ground.

7. The secondary-side controlled AC-DC converter of claim 1, wherein the active clamp FET is a p-type FET (PFET) comprising a referenced ground.

8. The secondary-side controlled AC-DC converter of claim 1, further comprising a capacitor coupled between the active clamp FET and a rectified DC line (VIN).

9. The secondary-side controlled AC-DC converter of claim 1, wherein a source of the secondary-side FET is coupled to a GND terminal of a USB-C connector.

10. A method comprising:
generating, by a secondary-side controller in a secondary-side controlled alternating current to direct current (AC-DC) flyback converter, a control signal;
controlling, by the secondary-side controller, a primary-side field effect transistor (FET) coupled to a primary side of a flyback transformer of the secondary-side controlled AC-DC flyback converter using a first pulse at a first signal level based on the control signal, wherein controlling the primary-side FET comprises sending the first pulse using a dual-level pulse transformer coupled between a primary-side controller and the secondary-side controller; and
controlling, by the secondary-side controller, an active clamp FET on the primary side of the flyback transformer using a second pulse at a second signal level based on the control signal, the second signal level being different than the first signal level, wherein controlling the active clamp FET comprises sending the second pulse using the dual-level pulse transformer.

11. The method of claim 10, further comprising:
determining, by the secondary-side controller, output power on a direct current (DC) output line;
activating a secondary-side FET and the active clamp FET for a first duration of time in response to determining that the output power is above a threshold; and
de-activating the secondary-side FET and the active clamp FET for a second duration of time in response to determining that the output power is below the threshold.

12. An alternating current to direct current (AC-DC) power adapter device comprising:
a USB-C connector;
a transformer coupled between AC terminals and DC terminals, the transformer to convert AC power on the AC terminals to DC power on the DC terminals with galvanic isolation between the AC terminals and DC terminals;
a primary-side field effect transistor (FET);
a primary-side controller;
a secondary-side FET;
an active clamp FET coupled to the secondary-side controller, wherein the active clamp FET is disposed on a primary side of the transformer;
a secondary-side controller coupled to the transformer, wherein the secondary-side controller is to control the active clamp FET and the primary-side FET across a same galvanic isolation barrier; and
a dual-level pulse transformer coupled between the active clamp FET and the secondary-side controller to provide the same galvanic isolation barrier between the secondary-side controller and the primary-side controller;
wherein the secondary-side controller is to send a first pulse at a first signal level to control the active clamp FET via the dual-level pulse transformer, wherein the secondary-side controller is to send a second pulse at a second signal level to control the primary-side FET via the dual-level pulse transformer, and wherein the second signal level is different than the first signal level.

13. The AC-DC power adapter device of claim 12, wherein the secondary-side controller comprises:
a programmable reference supply to provide a third signal level;
a first-level signal generator coupled to a voltage supply and the programmable reference supply, the first-level signal generator to generate the first pulse at the first signal level; and
a second-level signal generator coupled to the voltage supply, the second-level signal generator to generate the second pulse at the second signal level, wherein the first signal level is greater than the third signal level and less than the second signal level.

14. The AC-DC power adapter device of claim 13, wherein:
the first-level signal generator comprises a first pull-up transistor and a first pull-down transistor;
the second-level signal generator comprises a second pull-up transistor and a second pull-down transistor to generate the second pulse; and
the secondary-side controller comprises:
a pull-up pre-driver to activate the second pull-up transistor to turn on the primary-side FET;
a pull-down pre-driver to activate the second pull-down transistor to turn off the primary-side FET or the active clamp FET; and
a pre-driver to activate the first pull-up transistor to turn on the active clamp FET.

15. The AC-DC power adapter device of claim 14, wherein the first-level signal generator further comprises an amplifier comprising a first input coupled to the programmable reference supply and a second input coupled to a common node between the first pull-up transistor and the first pull-down transistor.

16. The AC-DC power adapter device of claim 13, wherein the programmable reference supply comprises:
a resistor;
a programmable current source coupled to the resistor; and
a voltage clamp coupled to a node between the resistor and the programmable current source, the voltage clamp to provide a clamped voltage at the third signal level.

17. The AC-DC power adapter device of claim 12, wherein a source of the secondary-side FET is coupled to a GND terminal of the USB-C connector.

* * * * *